United States Patent
Kouno et al.

(10) Patent No.: US 11,078,355 B2
(45) Date of Patent: Aug. 3, 2021

(54) (METH)ACRYLIC COPOLYMER, RESIN COMPOSITION, MOLDED BODY OF SAME, AND METHOD FOR PRODUCING MOLDED BODY

(71) Applicant: MITSUBISHI GAS CHEMICAL COMPANY, INC., Tokyo (JP)

(72) Inventors: Kazuki Kouno, Kanagawa (JP); Hisayuki Kuwahara, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 34 days.

(21) Appl. No.: 16/334,197

(22) PCT Filed: Sep. 25, 2017

(86) PCT No.: PCT/JP2017/034398
§ 371 (c)(1),
(2) Date: Mar. 18, 2019

(87) PCT Pub. No.: WO2018/056420
PCT Pub. Date: Mar. 29, 2018

(65) Prior Publication Data
US 2019/0203031 A1 Jul. 4, 2019

(30) Foreign Application Priority Data
Sep. 26, 2016 (JP) .............................. JP2016-186756

(51) Int. Cl.
*C08L 69/00* (2006.01)
*C08L 33/12* (2006.01)
*C08L 33/14* (2006.01)
*C08F 220/14* (2006.01)
*C08F 220/36* (2006.01)
*C08K 5/13* (2006.01)
*C08K 5/524* (2006.01)
*B29C 45/00* (2006.01)
*C08K 5/3492* (2006.01)
*C08K 5/3475* (2006.01)
*C08K 5/357* (2006.01)
*C08L 33/04* (2006.01)
(Continued)

(52) U.S. Cl.
CPC .......... *C08L 33/14* (2013.01); *B29C 45/0001* (2013.01); *C08F 220/14* (2013.01); *C08F 220/36* (2013.01); *C08K 5/13* (2013.01); *C08K 5/3475* (2013.01); *C08K 5/3492* (2013.01); *C08K 5/357* (2013.01); *C08K 5/524* (2013.01); *C08L 33/04* (2013.01); *C08L 33/066* (2013.01); *C08L 33/12* (2013.01); *C08L 69/00* (2013.01); *B29K 2033/08* (2013.01); *B29K 2033/12* (2013.01)

(58) Field of Classification Search
None
See application file for complete search history.

(56) References Cited

U.S. PATENT DOCUMENTS 2,458,888 A * 1/1949 Rehberg ............... C08F 20/28
526/320
4,745,029 A 5/1988 Kambour
4,906,696 A 3/1990 Fischer et al.
(Continued)

FOREIGN PATENT DOCUMENTS

JP 62-131056 6/1987
JP 4-359954 12/1992
(Continued)

OTHER PUBLICATIONS

Supplemental European Search Report issued in EP application No. 17853188.5 dated Sep. 2, 2019.
(Continued)

*Primary Examiner* — David J Buttner
(74) *Attorney, Agent, or Firm* — Greenblum & Bernstein, P.L.C.

(57) ABSTRACT

Provided is a resin composition which is capable of forming a molded body that has excellent surface hardness, transparency, hue and weather resistance, while exhibiting excellent wet heat resistance. A resin composition which contains a (meth)acrylic copolymer (A) and a polycarbonate-based resin (B), and wherein: the (meth)acrylic copolymer (A) contains an aromatic (meth)acrylate unit (a1), a methyl (meth)acrylate unit (a2) and a (meth)acrylate unit (a3) represented by formula (1); the mass ratio (a1)/(a2) is from 5/95 to 85/15; the content of the unit (a3) is 0.1-10 parts by mass relative to 100 parts by mass of the total of the units (a1) and (a2); and the unit (a1) is different from the unit (a3).

(1)

[chemical structure]

28 Claims, No Drawings

(51) Int. Cl.
*C08L 33/06* (2006.01)
*B29K 33/00* (2006.01)

(56) References Cited

U.S. PATENT DOCUMENTS

| | | | |
|---|---|---|---|
| 5,453,452 A | * 9/1995 | Nakayama | C07C 69/54 |
| | | | 522/92 |
| 6,123,850 A | 9/2000 | Commarieu et al. | |
| 2013/0012626 A1 | 1/2013 | Shimanaka et al. | |
| 2014/0371375 A1 | 12/2014 | Chung et al. | |
| 2016/0215139 A1 | 7/2016 | Kouno et al. | |
| 2017/0198139 A1 | 7/2017 | Kouno et al. | |

FOREIGN PATENT DOCUMENTS

| JP | 9-25438 | | 1/1997 |
|---|---|---|---|
| JP | 2002-179902 | | 6/2002 |
| JP | 2002179902 | * | 6/2002 |
| JP | 2003-238887 | | 8/2003 |
| JP | 2003326645 | | 11/2003 |
| JP | 2010-116501 | | 5/2010 |
| JP | 2005-272727 | | 4/2011 |
| JP | 2011-68865 | | 4/2011 |
| JP | 2014-62148 | | 4/2014 |
| JP | 2014 201735 A | | 10/2014 |
| JP | 2014201735 | * | 10/2014 |
| WO | 2009/051373 | | 4/2009 |
| WO | 2013/094898 | | 6/2013 |
| WO | 2015/053145 | | 4/2015 |
| WO | 2016/125414 | | 8/2016 |

OTHER PUBLICATIONS

International Search Report issued in International Application No. PCT/JP2017/034398, dated Dec. 5, 2017.

* cited by examiner

(METH)ACRYLIC COPOLYMER, RESIN COMPOSITION, MOLDED BODY OF SAME, AND METHOD FOR PRODUCING MOLDED BODY

TECHNICAL FIELD

The present invention relates to a (meth)acrylic copolymer, a resin composition containing the same, a molded body of the resin composition and a method for producing the molded body.

BACKGROUND ART

Polycarbonate-based resins are widely used in electric, electronic and office automation equipments, optical media, automotive parts, building components and the like because of excellent mechanical strength, heat resistance, electrical property, dimensional stability, flame retardance, transparency and the like thereof.

Such polycarbonate-based resins are usually produced by an interface method in which bisphenol A (aromatic dihydroxy compound) and phosgene are directly reacted with each other, a melting method in which bisphenol A and diphenyl carbonate (diester carbonate) are subjected to a transesterification reaction (polycondensation reaction) in a molten state, or the like.

However, a molded body obtained from a polycarbonate-based resin that is produced using bisphenol A as an aromatic dihydroxy compound comes short in terms of surface hardness, for example, for the application to automotive headlamps, spectacle lenses and outdoor use such as sheets.

For this reason, a hard coat layer or the like is often provided on the surface of the polycarbonate-based resin to enhance the surface hardness.

Providing a hard coat layer or the like on the surface, however, increases the number of steps of the production process, resulting in decrease of the production efficiency. Furthermore, in a case where a molded body has a complicated shape, it is difficult to provide a hard coat layer.

Accordingly, a considerable number of researches on enhancing the surface hardness while maintaining the transparency by blending a specific resin into a polycarbonate-based resin have been done. As the resin to be blended into a polycarbonate-based resin, a number of cases propose to use an acrylic resin that is transparent like the polycarbonate-based resin. For example, Patent Documents 1 and 2 disclose resin compositions comprising a polycarbonate-based resin and an acrylic resin having a molecular weight in a specific range. In addition, some cases propose to blend an acrylic copolymer. For example, Patent Documents 3 to 9 disclose resin compositions comprising a polycarbonate-based resin and a (meth)acrylic copolymer.

However, the above-described resin compositions have difficulty in providing both sufficient surface hardness and transparency to molded bodies, or even if both surface hardness and transparency can be provided, there is a problem of deterioration of hue and weather resistance after molding. In particular, resin compositions containing an aromatic (meth)acrylic copolymer have a problem that hue and weather resistance of molded bodies are significantly deteriorated.

As a method for improving hue and weather resistance while maintaining good surface hardness and transparency, the addition of an ultraviolet absorber and an antioxidant to a resin composition containing an aromatic (meth)acrylic copolymer is proposed (Patent Document 10).

PRIOR ART DOCUMENTS

Patent Documents

Patent Document 1: Japanese Laid-Open Patent Publication No. S62-131056
Patent Document 2: Japanese Laid-Open Patent Publication No. S63-139935
Patent Document 3: Japanese Laid-Open Patent Publication No. S64-1749
Patent Document 4: Japanese Laid-Open Patent Publication No. 2010-116501
Patent Document 5: Japanese Laid-Open Patent Publication No. H04-359954
Patent Document 6: Japanese National-phase PCT Laid-Open Patent Publication No. 2011-500914
Patent Document 7: International Publication WO2013/094898 pamphlet
Patent Document 8: Japanese Laid-Open Patent Publication No. 2014-62148
Patent Document 9: International Publication WO2015/053145 pamphlet
Patent Document 10: International Publication WO2016/125414 pamphlet

SUMMARY OF THE INVENTION

Problems to be Solved by the Invention

The molded body of the resin composition proposed in Patent Document 10 described above is easily whitened under high-temperature and high-humidity conditions and may have insufficient moist heat resistance.

Accordingly, the purpose of one embodiment of the present invention is to provide a resin composition which is capable of forming a molded body that has excellent surface hardness and transparency, while exhibiting excellent moist heat resistance. Further, the purpose of another embodiment of the present invention is to provide a molded product of the above-described resin composition and a production method thereof, and a (meth)acrylic copolymer which is a constituent of the resin composition.

Means for Solving the Problems

The present inventors diligently made researches and found that the above-described problems can be solved by using a (meth)acrylic copolymer containing a (meth)acrylate unit having a specific structure, and thus the present invention was achieved. Specifically, the present invention is, for example, as follows:

[1] A resin composition which contains a (meth)acrylic copolymer (A) and a polycarbonate-based resin (B), wherein:

the (meth)acrylic copolymer (A) contains an aromatic (meth)acrylate unit (a1), a methyl (meth)acrylate unit (a2) and a (meth)acrylate unit (a3) represented by formula (1) below; the mass ratio (a1)/(a2) is from 5/95 to 99/1; the content of the unit (a3) is 0.1 to 10 parts by mass relative to 100 parts by mass of the total of the units (a1) and (a2); and the unit (a1) is different from the unit (a3):

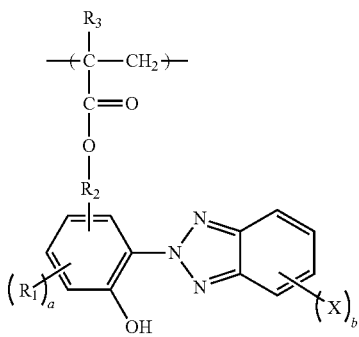

(1)

wherein:

X represents a halogen atom or a $C_{1-10}$ alkyl group;

$R_1$ represents a $C_{1-10}$ alkyl group;

$R_2$ represents a single bond, a $C_{1-10}$ alkylene group, a $C_{1-10}$ oxyalkylene group or a $C_{1-10}$ hydroxyoxyalkylene group;

$R_3$ represents a hydrogen atom or a methyl group;

a represents an integer of 0 to 3; and b represents an integer of 0 to 4.

[2] The resin composition according to item [1], wherein the unit (a3) contains a structural unit represented by formula (2):

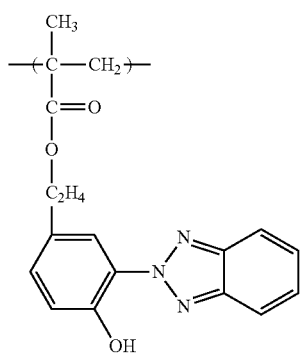

(2)

[3] The resin composition according to item [1] or [2], wherein the content of the unit (a3) is 0.1 to 4 parts by mass relative to 100 parts by mass of the total of the units (a1) and (a2).

[4] The resin composition according to any one of items [1] to [3], wherein the unit (a1) contains a structural unit represented by any one of formula (3) to formula (5):

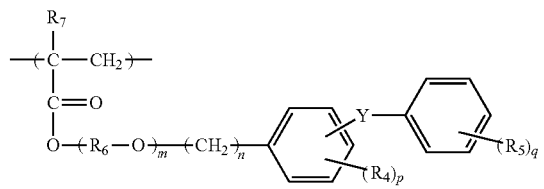

(3)

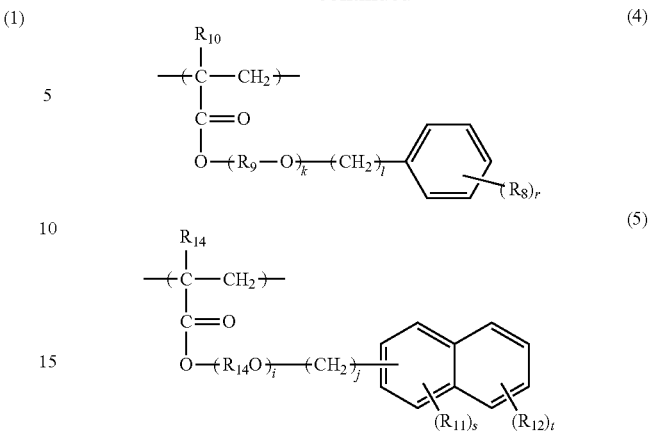

wherein in formula (3) to formula (5):

Y represents a single bond, or a divalent group selected from the group consisting of $-C(R_{15})(R_{16})-$, $-C(=O)-$, $-O-$, $-OC(=O)-$, $-OC(=O)O-$, $-S-$, $-SO-$, $-SO_2-$ and any combination thereof;

$R_4$ and $R_5$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;

$R_6$ represents a branched or unbranched $C_{2-6}$ alkylene group, a $C_{6-10}$ cycloalkylene group or a $C_{6-10}$ arylene group;

$R_7$ represents a hydrogen atom or a methyl group;

$R_8$ represents a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group or a halogen atom;

$R_9$ represents a branched or unbranched $C_{2-6}$ alkylene group, a $C_{6-10}$ cycloalkylene group or a $C_{6-10}$ arylene group;

$R_{10}$ represents a hydrogen atom or a methyl group;

$R_{11}$ and $R_{12}$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;

$R_{13}$ represents a branched or unbranched $C_{2-6}$ alkylene group, a $C_{6-10}$ cycloalkylene group or a $C_{6-10}$ arylene group;

$R_{14}$ represents a hydrogen atom or a methyl group;

$R_{15}$ and $R_{16}$ each independently represent a hydrogen atom, a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a phenyl group or a phenylphenyl group, or $R_{15}$ and $R_{16}$ may be bonded to each other to form a $C_{3-10}$ cyclic alkyl group together with a carbon atom to which they are attached;

m represents an integer of 0 to 10;

n represents an integer of 1 or 2;

k represents an integer of 0 to 10;

l represents an integer of 0 to 2;

i represents an integer of 0 to 10;

j represents an integer of 0 to 2;

p represents an integer of 0 to 4;

q represents an integer of 0 to 5;

r represents an integer of 0 to 5;

s represents an integer of 0 to 3; and t represents an integer of 0 to 4.

[5] The resin composition according to any one of items [1] to [4], wherein the (meth)acrylic copolymer (A) has a mass-average molecular weight of 3,000 to 1,000,000.

[5-1] The resin composition according to item [5], wherein the (meth)acrylic copolymer (A) has a mass-average molecular weight of 3,000 to 30,000.

[6] The resin composition according to any one of items [1] to [5], which contains an ultraviolet absorber (C) in an amount of 0 to 0.5 parts by mass relative to 100 parts by mass of a resin component that contains the (meth)acrylic copolymer (A) and the polycarbonate-based resin (B).

[7] The resin composition according to item [6], wherein the ultraviolet absorber (C) comprises at least one of a benzotriazole-based compound, a triazine-based compound and a benzoxazinone-based compound.

[8] The resin composition according to any one of items [1] to [7], which contains an antioxidant (D) in an amount of 0.05 to 1.0 parts by mass relative to 100 parts by mass of the resin component that contains the (meth)acrylic copolymer (A) and the polycarbonate-based resin (B).

[9] The resin composition according to item [8], wherein the antioxidant (D) comprises a phenol-based antioxidant.

[10] The resin composition according to item [8] or [9], wherein the antioxidant (D) comprises a phosphite-based antioxidant.

[11] The resin composition according to item [4], wherein the unit (a1) is represented by the formula (3).

[12] The resin composition according to item [11], wherein in the formula (3), m represents an integer of 1 to 3.

[13] The resin composition according to item [11] or [12], wherein in the formula (3), Y represents a single bond, —C($R_{15}$)($R_{16}$)—, —C(=O)—, —O—, —SO— or —$SO_2$—.

[14] The resin composition according to any one of items [11] to [13], wherein in the formula (3), both p and q are 0.

[15] The resin composition according to item [4], wherein:
the unit (a1) is represented by the formula (4); and
in the formula (4), k represents an integer of 1 to 3, and r is 0.

[16] The resin composition according to item [4], wherein:
the unit (a1) is represented by the formula (5); and
in the formula (5), i represents an integer of 1 to 3, and both s and t are 0.

[17] The resin composition according to any one of items [1] to [16], wherein in the resin component, the content of the (meth)acrylic copolymer (A) is 5 to 60% by mass, and the content of the polycarbonate-based resin (B) is 40 to 95% by mass.

[18] The resin composition according to any one of items [1] to [17], wherein the mass ratio (a1)/(a2) is from 5/95 to 85/15.

[18-1] The resin composition according to item [18], wherein the mass ratio (a1)/(a2) is from 15/85 to 25/75, and wherein the content of the unit (a3) is 0.1 to 4 parts by mass relative to 100 parts by mass of the total of the units (a1) and (a2).

[19] The resin composition according to any one of items [1] to [18] and [18-1], which further contains a (meth)acrylic copolymer (E) that is different from the (meth)acrylic copolymer (A) optionally, wherein in the resin component, the content of the (meth)acrylic copolymer (A) is 5 to 40% by mass, the content of the polycarbonate-based resin (B) is 40 to 95% by mass and the content of the (meth)acrylic copolymer (E) is 0 to 30% by mass.

[19-1] The resin composition according to item [19], wherein in the resin component, the content of the (meth)acrylic copolymer (A) is 5 to 25% by mass, the content of the polycarbonate-based resin (B) is 40 to 90% by mass and the content of the (meth)acrylic copolymer (E) is 5 to 30% by mass.

[19-2] The resin composition according to item [19] or [19-1], wherein the (meth)acrylic copolymer (A) has a mass-average molecular weight of 10,000 to 1,000,000.

[19-3] The resin composition according to any one of items [19], [19-1] and [19-2], wherein the (meth)acrylic copolymer (E) contains a methyl (meth)acrylate unit as the main component.

[20] The resin composition according to any one of items [19], [19-1] and [19-2], wherein the (meth)acrylic copolymer (E) contains 10 to 85% by mass of a (meth)acrylate unit (e1) represented by general formula (6) below and 15 to 90% by mass of a methyl (meth)acrylate unit (e2):

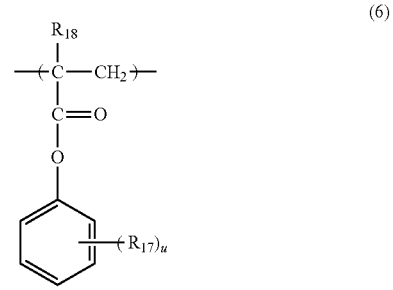

(6)

wherein:
$R_{17}$ each independently represents a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a substituted or unsubstituted phenyl group or a substituted or unsubstituted phenylphenyl group;
$R_{18}$ represents a hydrogen atom or a methyl group; and
u represents an integer of 0 to 5.

[20-2] The resin composition according to any one of items [1] to [18], [18-1], [19], [19-1] to [19-3], [20] and [20-1], which is a resin composition for injection molding.

[20-3] The resin composition according to any one of items [1] to [18], [18-1], [19], [19-1] to [19-3], [20], [20-1] and [20-2], wherein the total amount of the ultraviolet absorber (C) and the antioxidant (D) is 0.05 to 1.0 parts by mass relative to 100 parts by mass of the resin component that contains the (meth)acrylic copolymer (A) and the polycarbonate-based resin (B).

[21] A (meth)acrylic copolymer, which contains an aromatic (meth)acrylate unit (a1), a methyl (meth)acrylate unit (a2) and a (meth)acrylate unit (a3) represented by formula (1) below, wherein: the mass ratio (a1)/(a2) is from 5/95 to 99/1; the content of the unit (a3) is 0.1 to 10 parts by mass relative to 100 parts by mass of the total of the units (a1) and (a2); and the unit (a1) is different from the unit (a3):

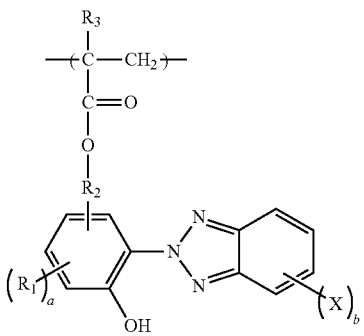

(1)

wherein:
X represents a halogen atom or a $C_{1-10}$ alkyl group;
$R_1$ represents a $C_{1-10}$ alkyl group;
$R_2$ represents a single bond, a $C_{1-10}$ alkylene group, a $C_{1-10}$ oxyalkylene group or a $C_{1-10}$ hydroxyoxyalkylene group;
$R_3$ represents a hydrogen atom or a methyl group;
a represents an integer of 0 to 3; and
b represents an integer of 0 to 4.

[21-1] The (meth)acrylic copolymer according to item [21], wherein the unit (a3) contains a structural unit represented by formula (2):

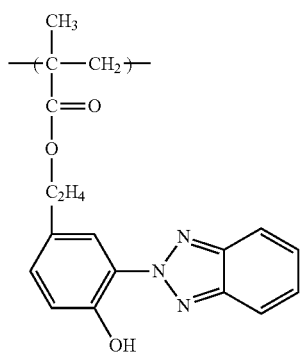

(2)

[21-2] The (meth)acrylic copolymer according to item [21] or [21-1], wherein the content of the unit (a3) is 0.1 to 4 parts by mass relative to 100 parts by mass of the total of the units (a1) and (a2).

[21-3] The (meth)acrylic copolymer according to any one of items [21], [21-1] and [21-2], wherein the unit (a1) contains a structural unit represented by any one of formula (3) to formula (5):

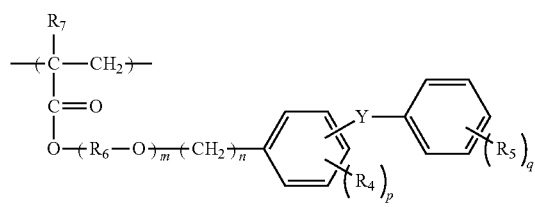

(3)

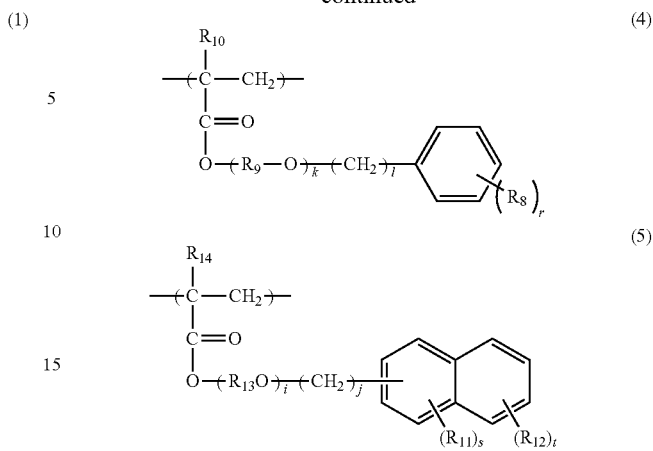

(4)

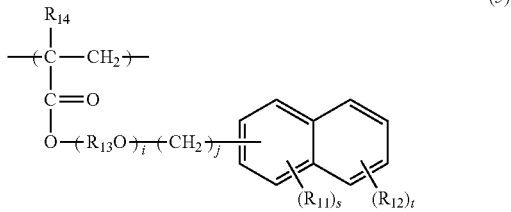

(5)

wherein in formula (3) to formula (5):
Y represents a single bond, or a divalent group selected from the group consisting of —$C(R_{15})(R_{16})$—, —$C(=O)$—, —O—, —$OC(=O)$—, —$OC(=O)O$—, —S—, —SO—, —$SO_2$— and any combination thereof;
$R_4$ and $R_5$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;
$R_6$ represents a branched or unbranched $C_{2-6}$ alkylene group, a $C_{6-10}$ cycloalkylene group or a $C_{6-10}$ arylene group;
$R_7$ represents a hydrogen atom or a methyl group;
$R_8$ represents a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group or a halogen atom;
$R_9$ represents a branched or unbranched $C_{2-6}$ alkylene group, a $C_{6-10}$ cycloalkylene group or a $C_{6-10}$ arylene group;
$R_{10}$ represents a hydrogen atom or a methyl group;
$R_{11}$ and $R_{12}$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;
$R_{13}$ represents a branched or unbranched $C_{2-6}$ alkylene group, a $C_{1-10}$ cycloalkylene group or a $C_{6-10}$ arylene group;
$R_{14}$ represents a hydrogen atom or a methyl group;
$R_{15}$ and $R_{16}$ each independently represent a hydrogen atom, a $C_{1-10}$ linear alkyl group, a $C_{3-10}$ branched alkyl group, a $C_{3-10}$ cyclic alkyl group, a $C_{1-10}$ linear alkoxy group, a $C_{1-10}$ branched alkoxy group, a $C_{3-10}$ cyclic alkoxy group, a phenyl group or a phenylphenyl group, or $R_{15}$ and $R_{16}$ may be bonded to each other to form a $C_{3-10}$ cyclic alkyl group together with a carbon atom to which they are attached;
m represents an integer of 0 to 10;
n represents an integer of 1 or 2;
k represents an integer of 0 to 10;
l represents an integer of 0 to 2;
i represents an integer of 0 to 10;
j represents an integer of 0 to 2;
p represents an integer of 0 to 4;
q represents an integer of 0 to 5;
r represents an integer of 0 to 5;
s represents an integer of 0 to 3; and
t represents an integer of 0 to 4.

[21-4] The (meth)acrylic copolymer according to any one of items [21] and [21-1] to [21-3], wherein the unit (a1) is represented by formula (3):

$$\begin{array}{c} R_7 \\ | \\ -\!\!\!+\!\!\!C\!-\!CH_2\!\!\!+\!\!\!- \\ | \\ C\!=\!O \\ | \\ O\!-\!\!\!+\!\!R_6\!-\!O\!\!\!+\!\!\!_m\!\!+\!CH_2\!\!\!+\!\!\!_n\!\!-\!\!\!\bigcirc\!\!\!-\!\!Y\!-\!\!\!\bigcirc\!\!\!-\!(R_5)_q \\ (R_4)_p \end{array} \quad (3)$$

wherein:

Y represents a single bond, or a divalent group selected from the group consisting of $-C(R_{15})(R_{16})-$, $-C(=O)-$, $-O-$, $-OC(=O)-$, $-OC(=O)O-$, $-S-$, $-SO-$, $-SO_2-$ and any combination thereof;

$R_4$ and $R_5$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;

$R_6$ represents a branched or unbranched $C_{2-6}$ alkylene group, a $C_{6-10}$ cycloalkylene group or a $C_{6-10}$ arylene group;

$R_7$ represents a hydrogen atom or a methyl group;

$R_{15}$ and $R_{16}$ each independently represent a hydrogen atom, a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a phenyl group or a phenylphenyl group, or $R_{15}$ and $R_{16}$ may be bonded to each other to form a $C_{3-10}$ cyclic alkyl group together with a carbon atom to which they are attached;

m represents an integer of 0 to 10;
n represents an integer of 1 or 2;
p represents an integer of 0 to 4; and
q represents an integer of 0 to 5.

[21-5] The (meth)acrylic copolymer according to item [21-3] or [21-4], wherein in the formula (3), m represents an integer of 1 to 3.

[21-6] The (meth)acrylic copolymer according to any one of items [21-3] to [21-5], wherein in the formula (3), Y represents a single bond, $-C(R_{15})(R_{16})-$, $-C(=O)-$, $-O-$, $-SO-$ or $-SO_2-$.

[21-7] The (meth)acrylic copolymer according to any one of items [21-3] to [21-6], wherein in the formula (3), both p and q are 0.

[21-8] The (meth)acrylic copolymer according to item [21-3], wherein:
the unit (a1) is represented by the formula (4); and
in the formula (4), k represents an integer of 1 to 3, and r is 0.

[21-9] The (meth)acrylic copolymer according to item [21-3], wherein:
the unit (a1) is represented by the formula (5); and
in the formula (5), i represents an integer of 1 to 3, and both s and t are 0.

[21-10] The (meth)acrylic copolymer according to any one of items [21] and [21-1] to [21-9], which has a mass-average molecular weight of 3,000 to 1,000,000.

[22] A resin composition which contains the (meth)acrylic copolymer according to any one of items [21] and [21-1] to [21-10].

[23-1] The resin composition according to item [22], which contains an ultraviolet absorber (C) in an amount of 0 to 0.5 parts by mass relative to 100 parts by mass of a resin component that contains the (meth)acrylic copolymer (A).

[23-2] The resin composition according to item [23-1], wherein the ultraviolet absorber (C) comprises at least one of a benzotriazole-based compound, a triazine-based compound and a benzoxazinone-based compound.

[23-3] The resin composition according to any one of items [22], [23-1] and [23-2], which contains an antioxidant (D) in an amount of 0.05 to 1.0 parts by mass relative to 100 parts by mass of the resin component that contains the (meth)acrylic copolymer (A).

[23-4] The resin composition according to item [23-3], wherein the antioxidant (D) comprises a phenol-based antioxidant.

[23-5] The resin composition according to item [23-3] or [23-4], wherein the antioxidant (D) comprises a phosphite-based antioxidant.

[23-6] The resin composition according to any one of items [22] and [23-1] to [22-5], which further contains a (meth)acrylic copolymer (E) that is different from the (meth)acrylic copolymer (A).

[23-7] The resin composition according to any one of items [22] and [23-1] to [23-6], wherein the (meth)acrylic copolymer (E) contains 10 to 85% by mass of a (meth)acrylate unit (e1) represented by general formula (6) below and 15 to 90% by mass of a methyl (meth)acrylate unit (e2):

$$\begin{array}{c} R_{18} \\ | \\ -\!\!\!+\!\!\!C\!-\!CH_2\!\!\!+\!\!\!- \\ | \\ C\!=\!O \\ | \\ O \\ | \\ \bigcirc\!\!\!-\!(R_{17})_u \end{array} \quad (6)$$

wherein:

$R_{17}$ each independently represents a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a substituted or unsubstituted phenyl group or a substituted or unsubstituted phenylphenyl group;

$R_{18}$ represents a hydrogen atom or a methyl group; and
u represents an integer of 0 to 5.

[24] A molded body formed by using the resin composition according to any one of items [1] to [18], [18-1], [19], [19-1] to [19-3], [20], [20-1] to [20-3], [22] and [23-1] to [23-7].

[24-1] A molded body obtained by injection-molding the resin composition according to any one of items [1] to [18], [18-1], [19], [19-1] to [19-3], [20], [20-1], [20-2], [22] and [23-1] to [23-7].

[24-2] The molded body according to item [24] or [24-1], wherein a test piece having a thickness of 3 mm obtained by injection molding at an injection temperature of 280° C., an injection speed of 50 mm/sec and a mold temperature of 80° C. has a yellowness index (YI) of 4.0 or lower.

[24-3] The molded body according to item [24], [24-1] or [24-2], wherein a test piece having a thickness of 2 mm after subjected to a pressure cooker test (105° C./100% RH conditions, 24-hour treatment) has a haze, as a measurement value, of 8.0% or less.

[25] A method for producing a molded body, wherein the resin composition according to any one of items [1] to [18], [18-1], [19], [19-1] to [19-3], [20], [20-1] to [20-3], [22] and [23-1] to [23-7] is injection molded.

[25-1] The method according to item [25], wherein the injection speed at the time of injection molding is 300 mm/sec or higher.

Advantageous Effect of the Invention

The present invention may have at least one of the below-described effects.
(1) When using the resin composition of the present invention, it is possible to form a molded body, which is excellent in surface hardness and transparency, and which is also excellent in moist heat resistance.
(2) It is possible to provide a resin composition having thermal stability and mold contamination resistance suitable for injection molding.
(3) It is possible to form a molded body having excellent transparency under a wide range of molding condition. In particular, since the resin composition can be used for high-speed injection molding, the productivity is improved.
(4) It is possible to form a molded body having excellent hue.
(5) It is possible to form a molded body having excellent weather resistance.
(6) A molded product containing a resin composition having at least one of the effects in (1) to (5) above, and a (meth)acrylic copolymer which is a constituent of the resin composition are provided.

BEST MODE FOR CARRYING OUT THE INVENTION

Hereinafter, embodiments of the present invention will be described in detail.

One embodiment of the present invention provides a resin composition which contains a (meth)acrylic copolymer (A) and a polycarbonate-based resin (B). The resin composition of the embodiment is characterized in that the (meth)acrylic copolymer (A) contains an aromatic (meth)acrylate unit (a1), a methyl (meth)acrylate unit (a2) and a (meth)acrylate unit (a3) represented by formula (1) described later, that the mass ratio (a1)/(a2) is from 5/95 to 99/1, that the content of the unit (a3) is 0.1 to 10 parts by mass relative to 100 parts by mass of the total of the units (a1) and (a2), and that the unit (a1) is different from the unit (a3).

By using the resin composition of the embodiment, it is possible to produce a molded body, which has excellent surface hardness because the (meth)acrylic copolymer is contained in the composition, and which also has excellent moist heat resistance, while excellent transparency inherent in the polycarbonate-based resin is maintained.

As described above, in the resin composition of prior art in which a polycarbonate-based resin is combined with a (meth)acrylic copolymer, when predetermined amounts of an ultraviolet absorber and an antioxidant are contained, hue and weather resistance are improved to some extent, but whitening is easily caused under high-temperature and high-humidity conditions, and moist heat resistance tends to be insufficient. Meanwhile, in the case of the resin composition according to the embodiment, by mixing a (meth)acrylic copolymer containing a (meth)acrylate unit (a3) represented by formula (1) described later with a polycarbonate-based resin, moist heat resistance can be improved. It is not known exactly why a molded product having high moist heat resistance can be obtained as described above, but when the unit (a3) having an ultraviolet-absorbing group is incorporated into the polymer chain of the copolymer, it seems to have an action of improving the moist heat resistance.

Further, in the case of the resin composition according to the embodiment, by mixing the (meth)acrylic copolymer containing the (meth)acrylate unit (a3) represented by formula (1) described later with the polycarbonate-based resin, a molded body excellent in hue and weather resistance can be obtained. The resin composition of prior art in which a polycarbonate-based resin is combined with an aromatic (meth)acrylic copolymer has a problem that deterioration of weather resistance is caused by many aromatic rings contained in the (meth)acrylic copolymer. Meanwhile, in the case of the resin composition according to the embodiment, the (meth)acrylate unit (a3) has an ultraviolet-absorbing group in its molecular structure. When using the (meth)acrylic copolymer containing the unit (a3), it is possible to suppress deterioration and color change of the resin caused by ultraviolet light that has an energy greater than the bond dissociation energy of the organic compound. Specifically, the ultraviolet-absorbing group in the unit (a3) absorbs ultraviolet light before deterioration and/or color change of the resin is caused by ultraviolet light to convert light energy to thermal energy, thereby suppressing deterioration and color change of the resin.

In this regard, "excellent hue" means less colored, that is, a low yellowness index (YI).

In particular, when using a (meth)acrylic copolymer containing the unit (a3) in a specific amount (0.1 to 10 parts by mass, preferably 0.1 to 4 parts by mass, and more preferably 0.5 to 2.0 parts by mass relative to 100 parts by mass of the total of the units (a1) and (a2)), a molded body having particularly excellent hue can be obtained.

Further, when using, as the aromatic (meth)acrylic copolymer, a structure in which the aromatic (meth)acrylate unit (a1) has two or more benzene rings in its ester moiety, weather resistance can be further improved.

Moreover, the resin composition according to the embodiment has thermal stability and mold contamination resistance suitable for injection molding. In the case of the resin composition of prior art in which the polycarbonate-based resin is combined with the (meth)acrylic copolymer, when specific amounts or more of an ultraviolet absorber and an antioxidant are contained therein for the purpose of improving weather resistance, deterioration and color change of the resin may be caused by heat at the time of injection molding, and mold contamination may be caused by generation of a mold deposit, etc. Meanwhile, in the case of the resin composition according to the embodiment, since weather resistance is improved when the (meth)acrylate unit (a3) represented by formula (1) described later is contained, it is possible to achieve a balance between weather resistance, thermal stability and mold contamination resistance.

Furthermore, in the case of the resin composition according to the embodiment, it is possible to form a molded body having excellent transparency under a wide range of molding conditions. Resin compositions containing a polycarbonate resin and a (meth)acrylic resin have a tendency that when the molding temperature is higher (about 280° C. or higher), and when the injection speed is higher in the case of injection molding (about 150 mm/sec or higher), transparency of molded bodies is more reduced.

Meanwhile, even when the resin composition according to the embodiment is molded under high-temperature conditions, and even when the injection speed is high (for example, 150 mm/sec or higher, 300 mm/sec or higher) in the case of injection molding, a molded body having excellent transparency can be obtained. Accordingly, since the resin composition according to the embodiment can be used for high-speed injection-molding and good molded products can be efficiently produced at a low cost, the productivity is improved.

It is not known exactly why a molded product having high transparency can be obtained under a wide range of molding conditions as described above, but in the aromatic (meth)acrylate unit (a1) and the (meth)acrylate unit (a3) represented by formula (1) described later in the (meth)acrylic copolymer (A), a benzene ring of an ester moiety seems to contribute to the improvement of the compatibility with the polycarbonate-based resin (B) and to have an action of improving the transparency of the molded body.

According to another embodiment of the present invention, a (meth)acrylic copolymer (A) is also provided. The (meth)acrylic copolymer (A) is characterized in that it contains an aromatic (meth)acrylate unit (a1), a methyl (meth)acrylate unit (a2) and a (meth)acrylate unit (a3) represented by formula (1) described later, that the mass ratio (a1)/(a2) is from 5/95 to 99/1, that the content of the unit (a3) is 0.1 to 10 parts by mass relative to 100 parts by mass of the total of the units (a1) and (a2), and that the unit (a1) is different from the unit (a3). In a specific embodiment, the (meth)acrylic copolymer (A) is characterized in that the mass ratio (a1)/(a2) is from 5/95 to 85/15.

Moreover, according to one embodiment of the present invention, a resin composition containing the (meth)acrylic copolymer (A) is also provided. By using the (meth)acrylic copolymer (A), moist heat resistance of the resin composition can be improved. It is not known exactly why the moist heat resistance is improved, but when the unit (a3) having an ultraviolet-absorbing group is incorporated into the polymer chain of the copolymer in a specific blending amount, it seems to have an action of improving the moist heat resistance.

In particular, when using a structure in which the aromatic (meth)acrylate unit (a1) has two or more benzene rings in the ester moiety thereof as the (meth)acrylic copolymer, transparency can be further improved.

Hereinafter, the (meth)acrylic copolymer (A) and each component contained in the resin composition according to the embodiment will be described.

[1] (Meth)Acrylic Copolymer (A)

The (meth)acrylic copolymer (A) that is a component of the resin composition according to the embodiment contains an aromatic (meth)acrylate unit (a1), a methyl (meth)acrylate unit (a2) and a (meth)acrylate unit (a3) represented by formula (1) described later. The "unit" refers to a structural portion derived from a raw material monomer to be used for producing a (meth)acrylate copolymer by means of copolymerization of monomers. Hereinafter, each of them will be described.

(1) Aromatic (Meth)Acrylate Unit (a1)

The (meth)acrylic copolymer (A) contains an aromatic (meth)acrylate unit (a1). The monomer that constitutes the aromatic (meth)acrylate unit (a1) is an aromatic (meth)acrylate. As used herein, the aromatic (meth)acrylate refers to a (meth)acrylate having an aromatic group in its ester moiety. The (meth)acrylate copolymer having the aromatic (meth)acrylate unit (a1) has excellent compatibility with the aromatic polycarbonate-based resin (B), and therefore can improve transparency of the resin composition obtained. The aromatic (meth)acrylate unit (a1) is different from a (meth)acrylate unit (a3) described later.

The aromatic (meth)acrylate unit (a1) is not particularly limited, and examples thereof include a structural unit represented by any one of formula (3) to formula (5) described below.

Preferred is a structural unit represented by formula (3) or formula (5). When using a structure in which the aromatic (meth)acrylate unit (a1) has two or more benzene rings in the ester moiety thereof, excellent transparency is obtained even in the case of high-speed injection molding. Particularly preferred is a structural unit represented by formula (3). The structural unit represented by formula (3) has two or more benzene rings (monocycles) in the ester moiety thereof, and has a structural feature in that the oxygen atom and the benzene rings are not directly bonded in the ester moiety. This structure makes it possible to achieve a balance between reduction in the molecular weight and suppression of reduction in the glass transition temperature, resulting in providing excellent compatibility with the polycarbonate resin, and therefore it is advantageous. In general, there is a tendency that the structure in which the oxygen atom and the benzene ring in the ester moiety are directly bonded has a difficulty in reduction in the molecular weight and has poorer compatibility with the polycarbonate-based resin. By employing the structure in which the oxygen atom and the benzene ring in the ester moiety are not directly bonded, reduction in the molecular weight can be easily carried out, but in this case, the glass transition temperature tends to be reduced. It is considered that the skeleton of the structure represented by formula (3) becomes rigid when two or more benzene rings are introduced into the ester moiety, and that this makes it possible to suppress reduction in the glass transition temperature while maintaining easiness of reduction in the molecular weight. Further, the structure represented by formula (3) is advantageous also on the point that a molded product having high transparency can be obtained under a wider range of molding conditions. It is considered that possession of two or more benzene rings makes it possible to improve compatibility between the (meth)acrylic copolymer (A) and the polycarbonate-based resin (B) and to maintain transparency of the molded body under a wide range of molding conditions. Moreover, the structure represented by formula (3) is advantageous also in terms of moist heat resistance.

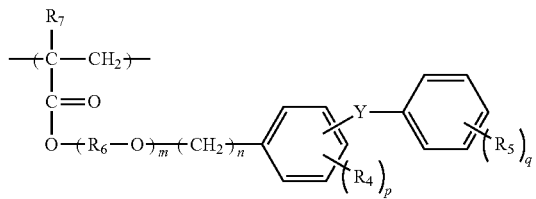

(3)

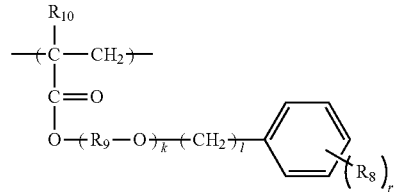

(4)

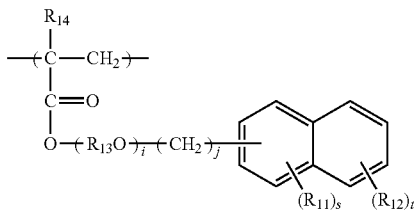

(5)

In formula (3) above, $R_4$ and $R_5$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group. These may have a substituent, and examples of the substituent include a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group and a halogen atom.

$R_4$ and $R_5$ are each independently selected preferably from a methyl group, a methoxy group, a chloro group, a bromo group and a phenyl group, and more preferably a phenyl group.

In formula (3) above, $R_6$ represents a branched or unbranched $C_{2-6}$ alkylene group, a $C_{6-10}$ cycloalkylene group or a $C_{6-10}$ arylene group. Among them, a $C_{2-6}$ alkylene group is preferred, ethylene or propylene is more preferred, and ethylene is particularly preferred.

In formula (3) above, $R_7$ represents a hydrogen atom or a methyl group, and preferably a methyl group.

In formula (3) above, Y represents a single bond, or a divalent group selected from the group consisting of —C($R_{15}$)($R_{16}$)—, —C(=O)—, —O—, —OC(=O)—, —OC(=O)O—, —S—, —SO—, —SO$_2$— and any combination thereof.

$R_{15}$ and $R_{16}$ each independently represent a hydrogen atom, a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a phenyl group or a phenylphenyl group. These may have a substituent, and examples of the substituent include a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group and a halogen atom. Alternatively, $R_{15}$ and $R_{16}$ may be bonded to each other to form a $C_{3-10}$ cyclic alkyl group together with a carbon atom to which they are attached.

Y is preferably a single bond, —C($R_{15}$)($R_{16}$)—, —C(=O)—, —O—, —SO— or —SO$_2$—. $R_{15}$ and $R_{16}$ are each independently selected preferably from a hydrogen atom, a methyl group, a methoxy group, a phenyl group and a phenylphenyl group, and more preferably a hydrogen atom.

Y is more preferably a single bond, —C($R_{15}$)($R_{16}$)—, —O— or —SO$_2$—, and particularly preferably a single bond, a methylene group or —O—.

In formula (3) above, m represents an integer of 0 to 10, preferably an integer of 0 to 3, and more preferably 0.

In formula (3) above, n represents an integer of 1 or 2, and preferably 1.

In formula (3) above, p represents an integer of 0 to 4, preferably an integer of 0 to 1, and more preferably 0. q represents an integer of 0 to 5, preferably an integer of 0 to 2, and more preferably 0. Particularly preferably, both p and q are 0.

Examples of the (meth)acrylate compound constituting the unit of formula (3) include 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate, 2-biphenylbenzyl(meth)acrylate, 4-benzylbenzyl(meth)acrylate, 3-benzylbenzyl(meth)acrylate, 2-benzylbenzyl(meth)acrylate, 4-phenethylbenzyl(meth)acrylate, 3-phenethylbenzyl(meth)acrylate, 2-phenethylbenzyl(meth)acrylate, 4-phenethylphenethyl(meth)acrylate, 3-phenethylphenethyl(meth)acrylate, 2-phenethylphenethyl(meth)acrylate, 4-(4-methylphenyl)benzyl(meth)acrylate, 3-(4-methylphenyl)benzyl(meth)acrylate, 2-(4-methylphenyl)benzyl(meth)acrylate, 4-(4-methoxyphenyl)benzyl(meth)acrylate, 3-(4-methoxyphenyl)benzyl(meth)acrylate, 2-(4-methoxyphenyl)benzyl(meth)acrylate, 4-(4-bromophenyl)benzyl(meth)acrylate, 3-(4-bromophenyl)benzyl(meth)acrylate, 2-(4-bromophenyl)benzyl(meth)acrylate, 4-benzoylbenzyl(meth)acrylate, 3-benzoylbenzyl(meth)acrylate, 2-benzoylbenzyl(meth)acrylate, 4-(phenylsulfinyl)benzyl(meth)acrylate, 3-(phenylsulfinyl)benzyl(meth)acrylate, 2-(phenylsulfinyl)benzyl(meth)acrylate, 4-(phenylsulfonyl)benzyl(meth)acrylate, 3-(phenylsulfonyl)benzyl(meth)acrylate, 2-(phenylsulfonyl)benzyl(meth)acrylate, 4-((phenoxycarbonyl)oxy)benzyl(meth)acrylate, 3-((phenoxycarbonyl)oxy)benzyl(meth)acrylate, 2-((phenoxycarbonyl)oxy)benzyl(meth)acrylate, 4-(((meth)acryloxy)methyl)phenyl benzoate, 3-(((meth)acryloxy)methyl)phenyl benzoate, 2-(((meth)acryloxy)methyl)phenyl benzoate, phenyl 4-(((meth)acryloxy)methyl)benzoate, phenyl 3-(((meth)acryloxy)methyl)benzoate, phenyl 2-(((meth)acryloxy)methyl)benzoate, 4-(1-phenylcyclohexyl)benzyl(meth)acrylate, 3-(1-phenylcyclohexyl)benzyl(meth)acrylate, 2-(1-phenylcyclohexyl)benzyl(meth)acrylate, 4-phenoxybenzyl(meth)acrylate, 3-phenoxybenzyl(meth)acrylate, 2-phenoxybenzyl(meth)acrylate, 4-(phenylthio)benzyl(meth)acrylate, 3-(phenylthio)benzyl(meth)acrylate, 2-(phenylthio)benzyl(meth)acrylate and 3-methyl-4-(2-methylphenyl)benzylmethacrylate. These compounds may be used solely, or two or more of them may be used in combination. Among them, preferred are 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate and 2-biphenylbenzyl(meth)acrylate, and more preferred are 4-phenylbenzyl(meth)acrylate, 3-phenylbenzyl(meth)acrylate, 2-phenylbenzyl(meth)acrylate, 4-benzylbenzyl(meth)acrylate, 4-phenoxybenzyl(meth)acrylate and 4-(phenylsulfonyl)benzyl(meth)acrylate.

In the structural unit of formula (4) above, $R_8$ represents a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group or a halogen atom. These may have a substituent, and examples of the substituent include a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group and a halogen atom.

$R_8$s are each independently selected preferably from a methyl group, a methoxy group, a chloro group and a bromo group.

In formula (4) above, $R_9$ represents a branched or unbranched $C_{2-6}$ alkylene group, a $C_{6-10}$ cycloalkylene group or a $C_{6-10}$ arylene group. Among them, a $C_{2-6}$ alkylene group is preferred, ethylene or propylene is more preferred, and ethylene is particularly preferred.

In formula (4) above, $R_{10}$ represents a hydrogen atom or a methyl group, and preferably a methyl group.

In formula (4) above, k represents an integer of 0 to 10, preferably an integer of 0 to 3, and more preferably 0 or 1.

In formula (4) above, l represents an integer of 0 to 2, and preferably 0 or 1.

In formula (4) above, r represents an integer of 0 to 5, preferably an integer of 0 to 2, and more preferably 0.

In one embodiment, k represents an integer of 1 to 3, and r is 0.

Examples of the (meth)acrylate compound that constitutes the unit of formula (4) above include phenyl (meth)acrylate, benzyl (meth)acrylate, phenoxyethyl (meth)acrylate, phenoxypropyl (meth)acrylate, benzoxyethyl (meth)acrylate and benzoxypropyl (meth)acrylate. These compounds may be used solely, or two or more of them may be used in combination. Among them, preferred are phenyl (meth)acrylate, benzyl (meth)acrylate and phenoxyethyl (meth)acrylate, and more preferred is phenyl methacrylate.

In formula (5) above, $R_{11}$, and $R_{12}$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group. These may have a substituent, and examples of the substituent include a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group and a halogen atom.

$R_{11}$ and $R_{12}$ are each independently selected preferably from a methyl group, a methoxy group, a chloro group, a bromo group and a phenyl group, and more preferably a phenyl group.

In formula (5) above, $R_{13}$ represents a branched or unbranched $C_{2-6}$ alkylene group, a $C_{6-10}$ cycloalkylene group or a $C_{6-10}$ arylene group. Among them, a $C_{2-6}$ alkylene group is preferred, ethylene or propylene is more preferred, and ethylene is particularly preferred.

In formula (5) above, $R_{14}$ represents a hydrogen atom or a methyl group, and preferably a methyl group.

In formula (5) above, i represents an integer of 0 to 10, preferably an integer of 0 to 3, and more preferably 0.

In formula (5) above, j represents an integer of 0 to 2, and preferably 0 or 1.

In formula (5) above, s represents an integer of 0 to 3, preferably an integer of 0 to 1, and more preferably 0. t represents an integer of 0 to 4, preferably an integer of 0 to 2, and more preferably 0. Particularly preferably, both s and t are 0.

In one embodiment, i represents an integer of 1 to 3, and both s and t are 0.

Examples of the (meth)acrylate compound constituting the unit of formula (5) include 1-naphthyl (meth)acrylate, 2-naphthyl (meth)acrylate, 1-naphthylmethyl (meth)acrylate, 2-naphthylmethyl (meth)acrylate, 1-naphthoxyethyl (meth)acrylate, 2-naphthoxyethyl (meth)acrylate, 1-naphthoxypropyl (meth)acrylate and 2-naphthoxypropyl (meth)acrylate. These compounds may be used solely, or two or more of them may be used in combination. Among them, preferred are 1-naphthyl methacrylate, 2-naphthyl methacrylate and 1-naphthylmethyl (meth)acrylate, and more preferred is l-naphthylmethyl (meth)acrylate.

(2) Methyl (Meth)Acrylate Unit (a2)

The (meth)acrylic copolymer (A) further contains a methyl (meth)acrylate unit (a2). The monomer that constitutes the methyl (meth)acrylate unit (a2) is a methyl (meth)acrylate. In this specification, a methyl acrylate unit and a methyl methacrylate unit are collectively called a "methyl (meth)acrylate unit". As the methyl (meth)acrylate unit (a2), a publicly-known monomer can be used. Since the methyl (meth)acrylate unit (a2) has good dispersibility in the polycarbonate-based resin (B), it has a capacity to improve the surface hardness of molded bodies.

Preferably, the methyl (meth)acrylate unit (a2) is either the methyl methacrylate unit or a combination of the methyl methacrylate unit and the methyl acrylate unit.

The content in the case where the methyl acrylate unit is contained is preferably 1 to 5% by mass relative to the copolymer (A) (100% by mass in total). When the content is less than 1% by mass, the decomposition temperature tends to decrease, and when the content is more than 5% by mass, the glass transition temperature tends to decrease.

(3) (Meth)Acrylate Unit (a3)

The (meth)acrylic copolymer (A) further contains a (meth)acrylate unit (a3) represented by formula (1):

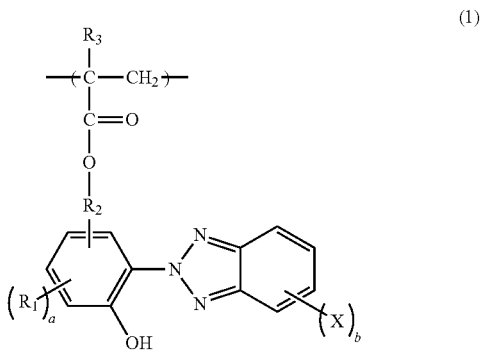

The (meth)acrylate unit (a3) represented by formula (1) has a ultraviolet-absorbing group. By using the (meth)acrylate copolymer containing the unit (a3) in a specific blending amount, weather resistance of resin compositions and molded bodies obtained can be improved.

Moreover, by using the (meth)acrylate copolymer containing the unit (a3), moist heat resistance of resin compositions and molded bodies obtained can also be improved.

In formula (1) above, X represents a halogen atom or a $C_{1-10}$ alkyl group. The $C_{1-10}$ alkyl group may be linear or branched or cyclic and may have a substituent. Examples of the substituent include a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group and a halogen atom.

Xs are each independently selected preferably from a methyl group, a chloro (Cl) group and a bromo (Br) group.

In formula (1) above, $R_1$ represents a $C_{1-10}$ alkyl group. The $C_{1-10}$ alkyl group may be linear or branched or cyclic and may have a substituent. Examples of the substituent include a $C_{1-10}$ linear alkyl group, a $C_{1-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group and a halogen atom.

$R_1$s are each independently selected preferably from a methyl group, a tert-butyl group, a chloro (Cl) group and a bromo (Br) group.

In formula (1) above, $R_2$ represents a single bond, a $C_{1-10}$ alkylene group, a $C_{1-10}$ oxyalkylene group or a $C_{1-10}$ hydroxyoxyalkylene group. Among them, a $C_{2-6}$ alkylene group is preferred, ethylene or propylene is more preferred, and ethylene is particularly preferred.

In formula (1) above, $R_3$ represents a hydrogen atom or a methyl group, and preferably a methyl group.

In formula (1) above, a represents an integer of 0 to 3, preferably an integer of 0 to 1, and more preferably 0.

In formula (1) above, b represents an integer of 0 to 4, preferably an integer of 0 to 1, and more preferably 0.

Examples of the (meth)acrylate compound constituting the unit of formula (1) include 2-[2'-hydroxy-5'-(methacryloyloxyethyl)phenyl]-2H-benzotriazole, 2-[2'-hydroxy-3'-tert-butyl-5'-(methacryloyloxyethyl)phenyl]-2H-benzotriazole, 2-[2'-hydroxy-3'-tert-butyl-5'-(methacryloyloxypropyl)phenyl]-2H-benzotriazole, 2-[2'-hydroxy-3'-methyl-5'-(methacryloyloxyethyl)phenyl]-2H-benzotriazole and 2-[(2'-hydroxy-5'-(methacryloyloxyethyl)phenyl)-5-chloro]-2H-benzotriazole. These compounds may be used solely, or two or more of them may be used in combination.

Among them, 2-[2'-hydroxy-5'-(methacryloyloxyethyl) phenyl]-2H-benzotriazole is preferred as the (meth)acrylate compound constituting the unit of formula (1). In this case, the unit (a3) is represented by formula (2):

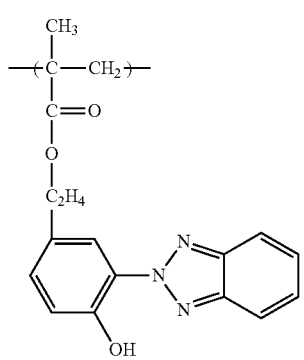

Next, the (meth)acrylic copolymer (A) will be explained.

In the (meth)acrylic copolymer (A), the mass ratio between the aromatic (meth)acrylate unit (a1) and the methyl (meth)acrylate unit (a2) ((a1)/(a2)) is from 5/95 to 99/1. From the viewpoint of transparency, (a1)/(a2) is preferably 5/95 or more. Meanwhile, when copolymerizing the (meth)acrylate unit (a) having a benzene ring in its ester moiety, the surface hardness including the pencil hardness of molded bodies of the (meth)acrylic copolymer (A) tends to be reduced. Accordingly, (a1)/(a2) is preferably 99/1 or less.

In one embodiment, (a1)/(a2) is from 5/95 to 85/15. When (a1)/(a2) is 85/15 or less, the value of the surface hardness of a molded body of the (meth)acrylic copolymer (A) is more sufficient. Accordingly, by molding a resin composition which is obtained by melt-kneading the (meth)acrylic copolymer (A) and the polycarbonate-based resin (B) whose surface hardness is relatively low, a molded body having a surface hardness more excellent than that in the case where only the polycarbonate-based resin (B) is used can be obtained.

The mass ratio between the aromatic (meth)acrylate unit (a1) and the methyl (meth)acrylate unit (a2) ((a1)/(a2)) in the (meth)acrylic copolymer (A) is more preferably from 5/95 to 80/20, even more preferably from 10/90 to 40/60, and particularly preferably from 15/85 to 25/75.

Further, the ratio of the methyl (meth)acrylate unit (a2) in the (meth)acrylic copolymer (A) is preferably 1 to 95% by mass, more preferably 10 to 95% by mass, even more preferably 20 to 95% by mass, and still more preferably 60 to 90% by mass relative to the copolymer (100% by mass in total).

In one embodiment, the resin composition does not further contain a (meth)acrylic copolymer (E) that is different from the (meth)acrylic copolymer (A) (described later), and the ratio of the methyl (meth)acrylate unit (a2) in the (meth)acrylic copolymer (A) is 20 to 95% by mass (particularly, 60 to 90% by mass) relative to the copolymer (100% by mass in total).

In the (meth)acrylic copolymer (A), the content of the (meth)acrylate unit (a3) represented by formula (1) is 0.1 to 10 parts by mass relative to 100 parts by mass of the total of the aromatic (meth)acrylate unit (a1) and the methyl (meth) acrylate unit (a2). It is preferred that the ratio of the unit (a3) is 0.1 parts by mass or more relative to the total of the unit (a1) and the unit (a2) (100 parts by mass) from the viewpoint of moist heat resistance and weather resistance, and high transparency in the case of injection molding at a high temperature/high speed. Meanwhile, there is a tendency that when the ratio of the unit (a3) is larger, the hue after molding is more deteriorated and the hue is more deteriorated due to retention at the time of molding. Accordingly, it is preferred that the ratio of the unit (a3) is 10 parts by mass or less from the viewpoint of suppressing deterioration of the hue and deterioration of the hue due to retention at the time of molding.

The content of the unit (a3) is more preferably 0.1 to 4 parts by mass, and even more preferably 0.5 to 2.0 parts by mass from the viewpoint of the hue.

The mass-average molecular weight (Mw) of the (meth) acrylic copolymer (A) is preferably 3,000 to 1,000,000.

In a specific embodiment, the mass-average molecular weight (Mw) of the (meth)acrylic copolymer (A) is preferably 3,000 to 30,000, more preferably 5,000 to 20,000, and particularly preferably 8,000 to 14,000. When the mass-average molecular weight (Mw) is 3,000 to 30,000, good compatibility with the polycarbonate-based resin (B) is obtained, and it is preferred in terms of transparency and surface hardness of the molded body. When the mass-average molecular weight (Mw) is more than 30,000, the (meth)acrylic copolymer (A) can easily agglutinate, for example, when being sheared upon molding, and as a result, transparency of the molded body obtained tends to be deteriorated. Meanwhile, when the mass-average molecular weight (Mw) is less than 3,000, the mechanical physical properties such as impact resistance and pencil hardness of the molded body obtained tend to be deteriorated. In particular, in embodiments in which a (meth)acrylic copolymer other than the (meth)acrylic copolymer (A) ((meth)acrylic copolymer (E) described later) is not contained, the above-described range of Mw is preferred. The mass-average molecular weight (Mw) of the (meth)acrylic copolymer (A) can be measured using gel permeation chromatography.

The (meth)acrylic copolymer (A) may also be produced by further copolymerizing another monomer (hereinafter referred to as component (a4)), according to need. The component (a4) is not particularly limited as long as it does not have adverse effect on the properties of the resin composition, and examples thereof include: methacrylates such as ethyl methacrylate, butyl methacrylate, propyl methacrylate and 2-ethylhexyl methacrylate; acrylates such as ethyl acrylate, butyl acrylate, propyl acrylate, 2-ethylhexyl acrylate and glycidyl acrylate; vinyl cyanide monomers such as acrylonitrile and methacrylonitrile; dienic monomers such as butadiene, isoprene and dimethyl butadiene; vinyl ether-based monomers such as vinyl methyl ether and vinyl ethyl ether; carboxylic-acid-based vinyl monomers such as vinyl acetate and vinyl butylate; olefinic monomers such as ethylene, propylene and isobutylene; ethylenic unsaturated carboxylic acid monomers such as acrylic acid, methacrylic acid, maleic acid and itaconic acid; halogenated vinyl monomers such as vinyl chloride and vinylidene chloride; maleimide-based monomers such as maleimide, N-phenylmaleimide, N-cyclohexylmaleimide and N-methylmaleimide; and crosslinking agents such as allyl (meth)acrylate, divinylbenzene and 1,3-buthylenedimethacrylate. Among them, methacrylate, acrylate and a vinyl cyanide monomer are preferable while acrylate is more preferable in terms of preventing thermal decomposition of the (meth)acrylic copolymer (A). These monomers may be used solely, or two or more of them may be used in combination.

When the above-described another monomer as the component (a4) is contained, it is contained in an amount of preferably 0.1 to 10 parts by mass, more preferably 0.1 to 5 parts by mass, and particularly preferably 0.1 to 3 parts by mass relative to 100 parts by mass of the total of the unit (a1) and the unit (a2).

When the content of the component (a4) is 0.1 parts by mass or more, heat decomposition of the (meth)acrylic copolymer (A) can be suppressed, and when the content is 10 parts by mass or less, it does not adversely affect the surface hardness and transparency of the molded body.

In one preferred example of the composition of the (meth)acrylic copolymer (A), the mass ratio between the aromatic (meth)acrylate unit (a1) and the methyl (meth)acrylate unit (a2) ((a1)/(a2)) is from 5/95 to 80/20, the content of the unit (a3) is 0.1 to 10 parts by mass relative to 100 parts by mass of the total of the units (a1) and (a2), and the content of the component (a4) is 0 to 10 parts by mass relative to 100 parts by mass of the total of the units (a1) and (a2).

The polymerization method for obtaining the (meth)acrylic copolymer (A) is not particularly limited and a publicly-known method such as emulsion polymerization, suspension polymerization, solution polymerization and block polymerization may be employed. Suspension polymerization and block polymerization are preferable while suspension polymerization is more preferable. Moreover, additives and the like which are required for polymerization can be suitably added according to need. Examples of such additives include a polymerization initiator, an emulsifier, a dispersant, a suspension stabilizer, a surfactant and a chain transfer agent.

The polymerization temperature is preferably 50° C. to 150° C., and more preferably 70° C. to 130° C., which may vary depending on the (meth)acrylate monomer composition and the additives such as the polymerization initiator. The polymerization may be carried out by increasing the temperature in a multi-step manner.

Although the polymerization time may vary depending on the polymerization method, the (meth)acrylate monomer composition and the additives such as the polymerization initiator, it is preferably 1 to 8 hours, and more preferably 2 to 6 hours at the intended temperature. To this polymerization time, the time that takes to reach the intended temperature should further be added.

Although the reaction pressure may vary depending on the polymerization method, the (meth)acrylate monomer composition and the like, the polymerization is carried out preferably at a reaction pressure of ordinary pressure to 3 MPa, and more preferably at a reaction pressure of ordinary pressure to 1 MPa.

[2] Polycarbonate-Based Resin (B)

The resin composition according to the embodiment may comprise a polycarbonate-based resin (B).

The polycarbonate-based resin (B) is not particularly limited as long as it contains a carbonate bond in the main chain of the molecule, i.e., it has a —[O—R—OCO]— unit. R in the formula may represent any of an aliphatic group, an aromatic group, and both aliphatic and aromatic groups. Among them, aromatic polycarbonate that is obtained using an aromatic dihydroxy compound such as bisphenol A is favorable in terms of the cost. Further, these polycarbonate-based resins may be used solely, or two or more of them may be used in combination.

The viscosity-average molecular weight (Mv) of the polycarbonate-based resin (B) can be calculated by a viscosity measurement method, which is preferably 15,000 to 30,000 and more preferably 17,000 to 25,000. As long as the viscosity-average molecular weight is within the above-mentioned range, a molded body having good compatibility with the (meth)acrylic copolymer (A) and better transparency and surface hardness can be obtained.

The method for producing the polycarbonate-based resin (B) can be suitably selected depending on the monomer used as the raw material. Examples thereof include the phosgene method and the transesterification method. Alternatively, a product that is available on the market can also be used. For example, Iupilon (registered trademark) S-3000 (manufactured by Mitsubishi Engineering-Plastics Corporation, Mv=22,000), Tarflon (registered trademark) FN1700 (manufactured by Idemitsu Kosan Co., Ltd., Mv=18,000) or the like can be used.

When the resin composition contains the polycarbonate-based resin (B), a resin component in the resin composition according to the embodiment preferably contains 5 to 60% by mass of the (meth)acrylic copolymer (A) and 40 to 95% by mass of the polycarbonate-based resin (B) (based on the total mass of respective resin components). In this regard, the total of all resins contained in the resin composition is referred to as the "resin component". When the resin composition contains the polycarbonate-based resin (B), the "resin component" consists of the (meth)acrylic copolymer (A) and the polycarbonate-based resin (B), and optionally a resin (R) described below.

Further, the resin component more preferably contains 5 to 50% by mass of the (meth)acrylic copolymer (A) and 50 to 95% by mass of the polycarbonate-based resin (B) (based on the total mass of respective resin components). When the content of the (meth)acrylic copolymer (A) in the resin component is 5% by mass or more, the compatibility between the (meth)acrylic copolymer (A) and the polycarbonate-based resin (B) and the flowability can be improved. Meanwhile, the haze tends to increase when the content of the (meth)acrylic copolymer (A) is too much, but deterioration of the transparency of the molded body obtained can be suppressed as long as the content of the (meth)acrylic copolymer (A) is 60% by mass or less.

In embodiments in which the resin composition does not contain a (meth)acrylic copolymer other than the (meth)acrylic copolymer (A) ((meth)acrylic copolymer (E) described later), the resin component more preferably contains 10 to 50% by mass of the (meth)acrylic copolymer (A) and 50 to 90% by mass of the polycarbonate-based resin (B), and even more preferably contains 15 to 25% by mass of the (meth)acrylic copolymer (A) and 75 to 85% by mass of the polycarbonate-based resin (B) (based on the total mass of respective resin components).

[3] Another Resin Component

The resin component in the resin composition may also contain another resin (R) other than the (meth)acrylic copolymer (A) and the polycarbonate-based resin (B) to an extent that does not inhibit the effect of the present invention.

Examples of such resin (R) include: polystyrene-based resins such as ABS, HIPS, PS and PAS; polyester-based resins such as polyethylene terephthalate and polybutylene terephthalate, for the improvement of chemical resistance, etc.; polyolefin-based resins; poly(meth)acrylic resins different from the (meth)acrylic copolymer (A); and polymer alloys such as elastomers that are blended with other thermoplastic resins.

The content of such resin is preferably within a range that does not impair the physical properties such as heat resistance, impact resistance and flame retardance that are inherent in the polycarbonate-based resin (B). For example, when the resin composition contains the polycarbonate-based resin (B), the resin (R) is contained in the resin component at a ratio of preferably 0 to 50% by mass, more preferably 0 to 30% by mass, and even more preferably 0 to 25% by mass.

Alternatively, when the resin composition does not contain the polycarbonate-based resin (B), the resin component may be composed of the (meth)acrylic copolymer (A) and the resin (R) or may also be composed of only the (meth) acrylic copolymer (A).

(Meth)Acrylic Copolymer (E)

In one embodiment, the resin composition further contains, as the resin (R), a (meth)acrylic copolymer (E) which is different from the (meth)acrylic copolymer (A). When a poly(meth)acrylic copolymer (E) is contained as the resin (R), it is excellent in terms of retention heat stability and suppression of whitening due to a wet heat test.

The (meth)acrylic copolymer (E) is not particularly limited as long as it is different from the (meth)acrylic copolymer (A).

In one embodiment, it is preferred that the (meth)acrylic copolymer (E) contains an aromatic (meth)acrylate unit and a methyl (meth)acrylate unit in terms of improving retention heat stability and moist heat resistance (suppression of whitening) without impairing initial transparency. For example, the (meth)acrylic copolymer (E) may contain a (meth)acrylate unit (e1) represented by general formula (6) and a methyl (meth)acrylate unit (e2) described later.

(Meth)Acrylate Unit (e1)

The (meth)acrylate unit (e1) is represented by general formula (6):

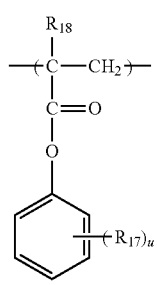

(6)

In formula (6) above, $R_{17}$ each independently represents a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a substituted or unsubstituted phenyl group or a substituted or unsubstituted phenylphenyl group. These may have a substituent, and examples of the substituent include a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group and a halogen atom.

$R_{17}$ is each independently selected preferably from a methyl group, a methoxy group, a chloro group, a bromo group and a phenyl group, and more preferably a phenyl group.

In formula (6) above, $R_{18}$ represents a hydrogen atom or a methyl group, and preferably a methyl group.

In formula (6) above, u represents an integer of 0 to 5, preferably an integer of 0 to 2, and more preferably 0.

Examples of the monomer that constitutes the (meth) acrylate unit (e1) represented by general formula (6) above include phenyl (meth)acrylate, 4-phenylphenyl (meth)acrylate, 3-phenylphenyl (meth)acrylate, 2-phenylphenyl (meth) acrylate, 4-biphenylphenyl (meth)acrylate, 3-biphenylphenyl (meth)acrylate, 2-biphenylphenyl (meth)acrylate, 4-methylphenyl (meth)acrylate, 3-methylphenyl (meth) acrylate, 2-methylphenyl (meth)acrylate, 4-ethylphenyl (meth)acrylate, 3-ethylphenyl (meth)acrylate, 2-ethylphenyl (meth)acrylate, 4-n-propylphenyl (meth)acrylate, 3-n-propylphenyl (meth)acrylate, 2-n-propylphenyl (meth)acrylate, 4-isopropylphenyl (meth)acrylate, 3-isopropylphenyl (meth)acrylate, 2-isopropylphenyl (meth)acrylate, 4-cyclohexylphenyl (meth)acrylate, 3-cyclohexylphenyl (meth) acrylate, 2-cyclohexylphenyl (meth)acrylate, 4-methoxyphenyl (meth)acrylate, 3-methoxyphenyl (meth)acrylate, 2-methoxyphenyl (meth)acrylate, 4-ethoxyphenyl (meth) acrylate, 3-ethoxyphenyl (meth)acrylate, 2-ethoxyphenyl (meth)acrylate, 4-fluorophenyl (meth)acrylate, 3-fluorophenyl (meth)acrylate, 2-fluorophenyl (meth)acrylate, 4-chlorophenyl (meth)acrylate, 3-chlorophenyl (meth)acrylate, 2-chlorophenyl (meth)acrylate, 4-bromophenyl (meth)acrylate, 3-bromophenyl (meth)acrylate, 2-bromophenyl (meth) acrylate, 4-iodophenyl (meth)acrylate, 3-iodophenyl (meth) acrylate and 2-iodophenyl (meth)acrylate. These monomers may be used solely, or two or more of them may be used in combination.

Among them, preferred are phenyl (meth)acrylate, 4-phenylphenyl (meth)acrylate, 4-methylphenyl (meth)acrylate and 4-methoxyphenyl (meth)acrylate, and more preferred are phenyl (meth)acrylate and 4-phenylphenyl (meth)acrylate.

Methyl (Meth)Acrylate Unit (e2)

The monomer that constitutes the methyl (meth)acrylate unit (e2) is a methyl (meth)acrylate. As the methyl (meth) acrylate unit (e2), the same substances as those for the methyl (meth)acrylate unit (a2) in the (meth)acrylic copolymer (A) can be preferably used.

In one embodiment, the (meth)acrylic copolymer (E) may be a resin, wherein: the (meth)acrylate unit (e1) represented by general formula (6) is contained in the copolymer at a ratio of 10 to 85% by mass; and the methyl (meth)acrylate unit (e2) is contained in the copolymer at a ratio of 15 to 90% by mass (hereinafter also referred to as "resin (E11)").

It is preferred that the ratio of the (meth)acrylate unit (e1) is 10% by mass or more from the viewpoint of transparency. It is preferred that the ratio of the methyl (meth)acrylate unit (e2) is 15% by mass or more from the viewpoint of the surface hardness of molded bodies. The ratio of the (meth) acrylate unit (e1) in the (meth)acrylic copolymer (E) is preferably 12 to 80% by mass, more preferably 15 to 60% by mass, and even more preferably 20 to 60% by mass.

Further, the ratio of the methyl (meth)acrylate unit (e2) in the (meth)acrylic copolymer (E) is preferably 20 to 88% by mass, and more preferably 40 to 80% by mass. From the viewpoint of the balance between weather resistance, retention heat stability and transparency at the time of injection molding at a high temperature/high speed, in a particularly preferred embodiment, the (meth)acrylic copolymer (E) may be a resin which contains 20 to 60% by mass of the (meth)acrylate unit (e1) and 40 to 80% by mass of the methyl (meth)acrylate unit (e2) based on the total mass of the copolymer (E).

Further, in one embodiment, the (meth)acrylic copolymer (E) is preferably a resin which contains the methyl (meth)acrylate unit (e2) as the main component (hereinafter also referred to as "resin (E12)") in terms of the improvement of weather resistance and retention heat stability. Note that to "contain as the main component" means that the content of the methyl (meth)acrylate unit exceeds 50% by mass relative to the total mass (100% by mass) of the (meth)acrylic copolymer (E). The content of the methyl (meth)acrylate unit in the (meth)acrylic copolymer (E) is preferably 75% by mass or more. Moreover, in a specific embodiment, from the viewpoint of the balance between weather resistance, retention heat stability and transparency at the time of injection molding at a high temperature/high speed, the (meth)acrylic copolymer (E) may be a resin, which contains the methyl (meth)acrylate unit (e2) as the main component, and which further contains an aromatic (meth)acrylate unit (e1).

As the methyl (meth)acrylate unit (e2), the same substances as those for the methyl (meth)acrylate unit (a2) in the (meth)acrylic copolymer (A) can be preferably used.

In a specific embodiment, the (meth)acrylic copolymer (E) may be a resin which contains 90 to 99% by mass (more preferably 95 to 99% by mass) of a methyl methacrylate unit (e2-1) and 1 to 10% by mass (more preferably 1 to 5% by mass) of a methyl acrylate unit (e2-2) based on the total mass of the copolymer (E) (hereinafter also referred to as "resin (E13)").

The mass-average molecular weight of the (meth)acrylic copolymer (E) is preferably 3,000 to 30,000, more preferably 5,000 to 20,000, and particularly preferably 8,000 to 14,000. When the mass-average molecular weight is 3,000 to 30,000, good compatibility with the polycarbonate-based resin (B) is obtained, and it is preferred in terms of transparency and surface hardness of the molded body.

The mass-average molecular weight (Mw), the number average molecular weight (Mn) and the molecular weight distribution (Mw/Mn) of the (meth)acrylic copolymer (E) can be measured using gel permeation chromatography.

The (meth)acrylic copolymer (E) may also be produced by further copolymerizing another monomer (hereinafter referred to as component (e3)), according to need. The component (e3) is not particularly limited as long as it does not have adverse effect on the properties of the resin composition. For example, the substances mentioned as examples of the component (a4) in the (meth)acrylic copolymer (A) can be used solely, or two or more of them may be used in combination.

When the above-described another monomer as the component (e3) is contained, it is contained in an amount of preferably 0.1 to 10 parts by mass, more preferably 0.1 to 5 parts by mass, and particularly preferably 0.1 to 3 parts by mass relative to 100 parts by mass of the total of the unit (e1) and the unit (e2). When the content of the component (e3) is 0.1 parts by mass or more, heat decomposition of the (meth)acrylic copolymer (E) can be suppressed, and when the content is 10 parts by mass or less, it does not adversely affect the surface hardness and transparency of the molded body.

The (meth)acrylic copolymer (E) can be synthesized by the same polymerization method as that explained with respect to the (meth)acrylic copolymer (A).

The (meth)acrylic copolymer (E) is contained in the resin component at a ratio of preferably 0 to 30% by mass, more preferably 0 to 25% by mass, and even more preferably 0 to 20% by mass (based on the total mass of respective resin components). For example, when the resin composition contains the polycarbonate-based resin (B), in the resin component, the content of the (meth)acrylic copolymer (A) is 5 to 40% by mass, the content of the polycarbonate-based resin (B) is 40 to 95% by mass, and the content of the (meth)acrylic copolymer (E) is 0 to 30% by mass (based on the total mass of respective resin components).

Preferred Embodiments in which (Meth)Acrylic Copolymer (E) is Contained

In one embodiment, in the resin component, the content of the (meth)acrylic copolymer (A) is 5 to 25% by mass, the content of the polycarbonate-based resin (B) is 50 to 90% by mass, and the content of the (meth)acrylic copolymer (E) is 5 to 30% by mass.

In a specific embodiment, the (meth)acrylic copolymer (E) includes the above-described resin (E11), and in the resin component, the content of the (meth)acrylic copolymer (A) is 5 to 25% by mass, the content of the polycarbonate-based resin (B) is 55 to 85% by mass, and the content of the (meth)acrylic copolymer (E) is 5 to 20% by mass.

In a specific embodiment, the (meth)acrylic copolymer (E) includes the above-described resin (E12) or the above-described resin (E13), and in the resin component, the content of the (meth)acrylic copolymer (A) is 5 to 20% by mass, the content of the polycarbonate-based resin (B) is 50 to 85% by mass, and the content of the (meth)acrylic copolymer (E) is 5 to 30% by mass. More preferably, the mass-average molecular weight (Mw) of the (meth)acrylic copolymer (A) is 50,000 to 1,000,000.

In a specific embodiment in which the (meth)acrylic copolymer (E) is contained, the total content of the aromatic (meth)acrylate unit in the resin composition, i.e., the total of the aromatic (meth)acrylate unit in the (meth)acrylic copolymer (A) and the aromatic (meth)acrylate unit in the (meth)acrylic copolymer (E) is preferably 10 to 40 parts by mass, more preferably 15 to 35 parts by mass, and even more preferably 20 to 30% by mass relative to 100 parts by mass of the resin component.

In a specific embodiment in which the (meth)acrylic copolymer (E) is contained, the mass-average molecular weight of the (meth)acrylic copolymer (A) is 10,000 to 1,000,000.

[4] Ultraviolet Absorber (C)

The resin composition according to the embodiment may comprise an ultraviolet absorber (C).

Examples of the ultraviolet absorber (C) include: inorganic ultraviolet absorbers such as cerium oxide and zinc oxide; and organic ultraviolet absorbers such as a benzotriazole-based compound, a benzophenone-based compound, a salicylate-based compound, a cyanoacrylate-based compound, a triazine-based compound, an oxanilide-based compound, a malonic acid ester compound, a hindered amine-based compound, an anilide oxalate-based compound and a benzoxazinone-based compound. Among them, preferred are organic ultraviolet absorbers, more preferred is a benzotriazole-based compound, a triazine-based compound or a benzoxazinone-based compound, and particularly preferred is a benzotriazole-based compound (a compound having the benzotriazole structure).

Specific examples of the benzotriazole-based compound include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-amyl)-benzotriazole, 2-(2'-hydroxy-5'-tert-octylphenyl)benzotriazole and 2,2'-methylenebis[4-(1,1,3,3-tetramethylbutyl)-6-(2N-benzotriazol-2-yl)phenol]. Among them, preferred are 2-(2'-hydroxy-5'-tert-octylphenyl)benzotriazole and 2,2'-methylenebis[4-(1,1,3,3-tetramethylbutyl)-6-(2N-benzotriazole-2-yl)phenol], and particularly preferred is 2-(2'-hydroxy-5'-tert-octylphenyl)benzotriazole. As such benzotriazole-based compounds, for example, "Seesorb 701", "Seesorb 705", "Seesorb 703", "Seesorb 702", "Seesorb 704" and "Seesorb 709" manufactured by Shipro Kasei Kaisha Ltd.; "Biosorb 520", "Biosorb 582", "Biosorb 580" and "Biosorb 583" manufactured by Kyodo Chemical Co., Ltd.; "Chemisorb 71" and "Chemisorb 72" manufactured by Chemipro Kasei Kaisha, Ltd.; "Cyasorb UV5411" manufactured by Cytec Industries Inc.; "LA-32", "LA-38", "LA-36", "LA-34" and "LA-31" manufactured by ADEKA Corporation; "Tinuvin P", "Tinuvin 234", "Tinuvin 326", "Tinuvin 327" and "Tinuvin 328" manufactured by Ciba Specialty Chemicals Inc.; etc. are available.

Specific examples of the benzophenone-based compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone and 2,2'-dihydroxy-4,4'-dimethoxybenzophenone. As such benzophenone-based compounds, for example, "Seesorb 100", "Seesorb 101", "Seesorb 101S", "Seesorb 102" and "Seesorb 103" manufactured by Shipro Kasei Kaisha Ltd.; "Biosorb 100", "Biosorb 110" and "Biosorb 130" manufactured by Kyodo Chemical Co., Ltd.; "Chemisorb 10", "Chemisorb 11", "Chemisorb 11S", "Chemisorb 12", "Chemisorb 13" and "Chemisorb 111" manufactured by Chemipro Kasei Kaisha, Ltd.; "Uvinul 400" manufactured by BASF; "Uvinul M-40" manufactured by BASF; "Uvinul MS-40" manufactured by BASF; "Cyasorb UV9", "Cyasorb UV284", "Cyasorb UV531" and "Cyasorb UV24" manufactured by Cytec Industries Inc.; "ADEKA STAB 1413" and "ADEKA STAB LA-51" manufactured by ADEKA Corporation; etc. are available.

Specific examples of the salicylate-based compound include phenyl salicylate and 4-tert-butylphenyl salicylate. As such salicylate-based compounds, for example, "Seesorb 201" and "Seesorb 202" manufactured by Shipro Kasei Kaisha Ltd.; "Chemisorb 21" and "Chemisorb 22" manufactured by Chemipro Kasei Kaisha, Ltd.; etc. are available.

Specific examples of the cyanoacrylate-based compound include ethyl-2-cyano-3,3-diphenyl acrylate and 2-ethylhexyl-2-cyano-3,3-diphenylacrylate. As such cyanoacrylate-based compounds, for example, "Seesorb 501" manufactured by Shipro Kasei Kaisha Ltd.; "Biosorb 910" manufactured by Kyodo Chemical Co., Ltd.; "Uvisolator 300" manufactured by Daiichi Kasei Co., Ltd.; "Uvinul N-35" and "Uvinul N-539" manufactured by BASF; etc. are available.

Specific examples of the oxanilide-based compound include 2-ethoxy-2'-ethyl oxanilic acid bisanilide. As such oxanilide-based compounds, for example, "Sanduvor VSU" manufactured by Clariant, etc. are available.

As the malonic acid ester compound, 2-(alkylidene)malonic acid esters are preferred, and 2-(1-arylalkylidene) malonic acid esters are more preferred. As such malonic acid ester compounds, for example, "PR-25" manufactured by Clariant (Japan) K.K. and "B-CAP" manufactured by Ciba Specialty Chemicals Inc. are available.

Examples of the triazine-based compound include 2,4-bis[2-hydroxy-4-butoxyphenyl]-6-(2,4-dibutoxyphenyl)-1,3,5-triazine, 2-(2-hydroxy-4-[1-octyloxycarbonylethoxy]phenyl)-4,6-bis(4-phenylphenyl)-1,3,5-triazine, 2-(4,6-diphenyl-1,3,5-triazine-2-yl)-5-[2-(2-ethylhexanoyloxy) ethoxy]-phenol, 2-[4,6-bis(2,4-dimethylphenyl)-1,3,5-triazine-2-yl]-5-(octyloxy)phenol, 2-(4,6-diphenyl-1,3,5-triazine-2-yl)-5-[(hexyl)oxy]-phenol and 2,4,6-tris(2-hydroxy-4-hexyoxy-3-methylphenyl)-1,3,5-triazine. As such triazine-based compounds, "ADEKA STAB LA-46" and "ADEKA STAB LA-F70" manufactured by ADEKA Corporation; "Tinuvin 460", "Tmuvin 479" and "Tmuvin 1577" manufactured by BASF; "Cyasorb UV1164" manufactured by Cytec Industries Inc.; etc. are available.

Specific examples of the benzoxazinone-based compound include 2,2'-(1,4-phenylene)bis-4H-3,1-benzoxazinone-4-one. As such benzoxazinone-based compounds, "Cyasorb UV3638" manufactured by Cytec Industries Inc., etc. are available.

The blending amount of the ultraviolet absorber (C) is preferably 0 to 0.5 parts by mass, and more preferably 0 to 0.3 parts by mass relative to 100 parts by mass of the resin component.

By blending the ultraviolet absorber (C), weather resistance can be improved, but there is a tendency that the larger the blending amount is, the more moist heat resistance is deteriorated, and/or the more thermal stability and mold contamination resistance at the time of molding are deteriorated. When the blending amount is 0.5 parts by mass or less, the problems of whitening under high-temperature and high-humidity conditions, deterioration/color change of the resin at the time of molding, and mold contamination are less likely to occur.

In one embodiment of the present invention, the resin composition does not contain the ultraviolet absorber (C). In this embodiment, though the resin composition does not contain the ultraviolet absorber (C), weather resistance of the resin composition can be improved since the (meth) acrylate unit (a3) represented by formula (1) is contained.

Only one type of the ultraviolet absorber may be contained, or two or more types of ultraviolet absorbers may be contained with any combination and ratio.

[5] Antioxidant (D)

The resin composition according to the embodiment may comprise an antioxidant (D). The antioxidant can suppress deterioration and/or color change of the resin caused by free radicals such as peroxy radical generated when the resin is attacked by heat and oxygen. Specifically, the antioxidant traps and decomposes free radicals such as peroxy radical, thereby suppressing deterioration and color change of the resin.

Examples of the antioxidant (D) include a phenol-based antioxidant, an amine-based antioxidant, a phosphite-based antioxidant and a thioether-based antioxidant. Only one type of an antioxidant may be contained, or two or more types of antioxidants may be contained with any combination and ratio. Among them, the phenol-based antioxidant or phosphite-based antioxidant is preferred, and more preferred is use of the phenol-based antioxidant or combined use of the phenol-based antioxidant and the phosphite-based antioxidant.

Specific examples of the phenol-based antioxidant include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene bis[3-(3,5-di-tert-butyl-4-hydroxyphenyl)propionate], N,N'-hexane-1,6-diyl bis[3-(3,5-di-tert-butyl-4-hydroxyphenylpropionamide), 2,4-dimethyl-6-(1-methylpentadecyl)phenol, diethyl[[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octyl thiomethyl)-o-cresol, ethylene bis(oxyethylene)bis[3-(5-tert-butyl-4-hydroxy-m-tolyl) propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, and 2,6-di-tert-butyl-4-(4,6-bis(octylthio)-1,3,5-triazine-2-ylamino)phenol.

Among them, pentaerythritol tetrakis[3-(3,5-di-tert-butyl-4-hydroxyphenyl)propionate] and octadecyl-3-(3,5-di-tert-butyl-4-hydroxyphenyl)propionate are preferred. As such phenol-based antioxidants, for example, "Irganox 1010" and "Irganox 1076" manufactured by Ciba; "ADEKA STAB AO-50" and "ADEKA STAB AO-60" manufactured by ADEKA Corporation; etc. are available.

Specific examples of the phosphite-based antioxidant include triphenyl phosphite, tris(nonylphenyl)phosphite, dilaurylhydrogen phosphite, triethyl phosphite, tridecyl phosphite, tris(2-ethylhexyl)phosphite, tris(tridecyl)phosphite, tristearyl phosphite, diphenyl monodecyl phosphite, monophenyl didecyl phosphite, diphenyl mono(tridecyl) phosphite, tetraphenyldipropylene glycol diphosphite, tetraphenyltetra(tridecyl)pentaerythritol tetraphosphite, hydrogenated bisphenol A phenol phosphite polymer, diphenylhydrogen phosphite, 4,4'-butylidene-bis(3-methyl-6-tert-butylphenyldi(tridecyl)phosphite), tetra(tridecyl)4,4'-isopropylidenediphenyl diphosphite, bis(tridecyl)pentaerythritol diphosphite, bis(nonylphenyl)pentaerythritol diphosphite, dilaurylpentaerythritol diphosphite, distearylpentaerythritol diphosphite, tris(4-tert-butylphenyl)phosphite, tris(2,4-di-tert-butylphenyl)phosphite, hydrogenated bisphenol A pentaerythritol phosphite polymer, bis(2,4-di-tert-butylphenyl)pentaerythritol diphosphite, bis(2,6-di-tert-butyl-4-methylphenyl)pentaerythritol diphosphite, 2,2'-methylenebis(4,6-di-tert-butylphenyl)octyl phosphite, and bis(2,4-dicumylphenyl)pentaerythritol diphosphite.

Among them, tris(2,4-di-tert-butylphenyl)phosphite, 2,2'-methylenebis(4,6-di-tert-butylphenyl)octyl phosphite, bis(2,6-di-tert-butyl-4-methylphenyl)pentaerythritol diphosphite and bis(2,4-dicumylphenyl)pentaerythritol diphosphite are preferred. As such phosphite-based antioxidants, for example, "ADEKA STAB 2112", "ADEKA STAB HP-10" and "ADEKA STAB PEP36" manufactured by ADEKA Corporation; "Doverphos S-9228" manufactured by Dover Chemical Corporation; etc. are available.

Specific examples of the amine-based antioxidant include aromatic amines such as poly(2,2,4-trimethyl-1,2-dihydroquinoline), 6-ethoxy-1,2-dihydro-2,2,4-trimethylquinoline, phenyl-α-naphthylamine, 4,4-bis(α,α-dimethylbenzyl)diphenylamine, (p-toluenesulfonylamido)diphenylamine, N,N'-diphenyl-p-phenylenediamine, N,N'-di-β-naphthyl-p-phenylenediamine, N,N'-di(1,4-dimethylpentyl)-p-phenylenediamine, N-phenyl-N'-isopropyl-p-phenylenediamine, N-phenyl-N'-1,3-dimethylbutyl-p-phenylenediamine and N-(1-methylheptyl)-N'-phenyl-p-phenylenediamine.

Specific examples of the thioether-based antioxidant include pentaerythrityl tetrakis(3-laurylthiopropionate), dilauryl-3,3'-thiodipropionate, dimyristyl-3,3'-thiodipmpionate and distearyl-3,3'-thiodipropionate.

The blending amount of the antioxidant (D) is 0.05 to 1.0 parts by mass, preferably 0.05 to 0.8 parts by mass, more preferably 0.1 to 0.5 parts by mass, and particularly preferably 0.1 to 0.4 parts by mass relative to 100 parts by mass of the resin component.

By blending the antioxidant (D), deterioration and/or color change of the resin can be suppressed, but there is a tendency that the larger the blending amount is, the more moist heat resistance is deteriorated, and/or the more thermal stability and mold contamination resistance at the time of molding are deteriorated. When the content of the antioxidant is 0.05 parts by mass or more, effects as the antioxidant tend to be sufficiently exerted. When the content of the antioxidant is 1.0 parts by mass or less, the problems of whitening under high-temperature and high-humidity conditions, deterioration/color change of the resin at the time of molding, and mold contamination are less likely to occur.

In the resin composition according to a preferred embodiment, the total amount of the ultraviolet absorber (C) and the antioxidant (D) is 0.05 to 1.0 parts by mass (more preferably 0.05 to 0.6 parts by mass, and even more preferably 0.05 to 0.5 parts by mass) relative to 100 parts by mass of the resin component. Particularly preferably, the total amount of the ultraviolet absorber (C) and the antioxidant (D) is 0.05 to 0.5 parts by mass relative to 100 parts by mass of the resin component, and the content of the unit (a3) in the (meth) acrylic copolymer (A) is 0.1 to 4 parts by mass relative to 100 parts by mass of the total of the unit (a1) and the unit (a2). In this case, moist heat resistance is particularly excellent.

The resin composition according to the embodiment may contain another additive and the like according to need to an extent that does not inhibit the effect of the present invention.

Examples of the above-described another additive that can be contained in the above-described resin composition include a stabilizer, a strengthening agent, a weather proofing agent, an inorganic filler, an impact resistance modifying agent, a flame retardant, an antistatic agent, a mold release agent, a pigment and fluoroolefin. Specifically, talc, mica, calcium carbonate, glass fiber, carbon fiber, potassium titanate fiber and the like may be used in order to improve the strength, the stiffness, the flame retardance or the like of the molded body. In addition, a rubber-like elastic body having a bilayer core-shell structure for improving the impact resistance, or the like may also be contained.

The resin composition according to the embodiment can be produced by a method in which the (meth)acrylic copolymer (A), the polycarbonate-based resin (B), and according to need, the ultraviolet absorber (C), the antioxidant (D) and the above-described another additive are mixed in a powdered state or a method in which they are melted by heating and kneaded. For such mixing, for example, a Henschel mixer, a Bunbury mixer, a single-screw-type extruder, a twin-screw-type extruder, a two spindle roller, a kneader, a Brabender or the like can be used.

The resin composition according to one embodiment of the present invention is a resin composition for injection molding. As described above, the resin composition according to the embodiment is capable of providing a molded body that has both excellent transparency and surface hardness even when injection-molded under high temperature conditions. Moreover, when the ratio of the (meth)acrylate unit (a3) represented by formula (1) and/or the blending amount of the ultraviolet absorber (C) are set to be a specific amount or less, more excellent thermal stability, mold contamination resistance, and hue (immediately after molding) are obtained.

[6] Molded Body

According to one embodiment, a molded body obtained by molding the above-described resin composition is provided.

The molded body obtained by molding the resin composition according to the embodiment has excellent moist heat resistance. For example, a test piece having a thickness of 2 mm after subjected to a pressure cooker test (105° C./100% RH conditions, 24-hour treatment) has a haze, as a measurement value, of preferably 8.0% or less, and more preferably 4.5% or less. The pressure cooker test can be conducted according to the method described in the Examples described later.

The molded body obtained by molding the resin composition according to the embodiment has a low yellowness index, and the yellowing degree after the weathering test is low.

The yellowness index (YI) of the molded body may vary depending on the size of an injection molding machine to be used for molding, the type of a mold, mold accuracy, etc., but specifically, in the case of a molded body immediately after injection-molded at an injection temperature of 280° C., an injection speed of 50 mm/sec and a mold temperature of 80° C., a test piece having a thickness of 3 mm has a yellowness index (YI) of preferably 4.0 or lower, more preferably 3.0 or lower, and even more preferably 2.0 or lower.

Further, after a plate test piece having a thickness of 2 mm, which is obtained by injection molding at an injection temperature of 300° C., an injection speed of 300 mm/sec and a mold temperature of 80° C., is subjected to a weathering test for 500 hours using Sunshine Weather Meter (85° C., without rain), the change in the yellowness index (ΔYI) is preferably 12 or less, more preferably 10 or less, and even more preferably 8.5 or less.

The yellowness index (YI) can be measured by using a haze meter.

The resin composition according to the embodiment is capable of providing a molded body that has both excellent transparency and surface hardness even when molded under high temperature conditions.

The transparency (haze) of the molded body may vary depending on the size of an injection molding machine to be used for molding, the type of a mold, mold accuracy, etc., but for example, a plate test piece having a thickness of 3 mm after molding has a haze of preferably 5% or less, more preferably 3% or less, and particularly preferably 1.5% or less. In particular, a plate test piece having a thickness of 3 mm, which is obtained by injection molding at an injection temperature of 280° C., an injection speed of 300 mm/sec and a mold temperature of 80° C., has a haze of preferably 5% or less, and more preferably 3% or less.

The pencil hardness of the plate test piece of the molded body is preferably HB or harder, and more preferably F or harder.

Examples of the method for molding the molded body according to the embodiment include compression molding, transfer molding, injection molding, blow molding, extrusion molding, lamination molding and calender molding. In particular, a molded body obtained by injection-molding the resin composition according to the embodiment is preferred. Accordingly, one embodiment of the present invention is a method for producing a molded body, which is characterized in that the resin composition according to the embodiment is injection-molded.

In the case of injection molding, regarding injection molding conditions, an injection temperature of 230 to 330° C., an injection speed of 10 to 500 mm/sec and a mold temperature of 60° C. or higher are favorable in terms of improving the surface hardness. Further, in the case of the resin composition according to the embodiment, a high injection speed can be employed. For example, from the viewpoint of the productivity, the injection speed for injection molding is preferably 150 mm/sec or higher, and more preferably 300 mm/sec or higher.

As described above, the molded body according to the embodiment maintains the properties such as excellent mechanical strength, heat resistance, electrical property, dimensional stability, flame retardance and transparency of the polycarbonate-based resin (B) while also having excellent surface hardness, moist heat resistance, hue after molding (i.e., low yellowness index) and weather resistance. Accordingly, the resin composition according to the embodiment can be used in a wide range of fields, for example, applications that require transparency such as materials for optical media and applications that require color developing property such as chassis. For example, the molded body according to the embodiment can be utilized in electric, electronic and office automation equipments, optical media, automobile parts, building components or the like. In particular, the molded body according to the embodiment has excellent moist heat resistance, and therefore can be preferably utilized in electrical and electronic equipments (e.g., personal computers, game machines, television receivers, display units such as liquid crystal display devices and plasma display devices, printers, copy machines, scanners, facsimiles, electronic organizers, PDAs, electronic desk calculators, electronic dictionaries, cameras, video cameras, mobile telephones, smartphones, tablets, battery packs, drives and readers of storage media, mouse devices, numeric keypads, CD players, MD players and portable radio sets/audio players), etc., which require moist heat resistance.

EXAMPLES

Hereinafter, the present invention will be described in detail with reference to examples, but the technical scope of the present invention should not be limited thereto.

In the examples, "parts" and "%" mean "parts by mass" and "% by mass", respectively.

Abbreviations used in the working examples are described below.

Abbreviations a1-1: 4-phenylbenzyl methacrylate
a1-2: 1-naphthylmethyl methacrylate
a1-3: phenyl methacrylate
a2-1: methyl methacrylate
a2-2: methyl acrylate
a3-1: 2-[2'-hydroxy-5'-(methacryloyloxyethyl)phenyl]-2H-benzotriazole
b-1: Iupilon (registered trademark) S-3000 (manufactured by Mitsubishi Engineering-Plastics Corporation, viscosity average molecular weight: 22,000)
c-1: Seesorb 709 (manufactured by Shipro Kasei Kaisha Ltd.)
d-1: phenol-based antioxidant, ADEKA STAB AO-60 (manufactured by ADEKA Corporation)
d-2: phosphite-based antioxidant, ADEKA STAB 2112 (manufactured by ADEKA Corporation)

Further, the respective physical properties in Examples and Comparative Examples were measured by the below-described methods.

[Molecular Weight of (Meth)Acrylic Copolymer]

A (meth)acrylic copolymer was dissolved in tetrahydrofuran (THF) and subjected to measurement using gel permeation chromatography (GPC). Mw, Mn and Mw/Mn of each copolymer were calculated based on a calibration curve for standard polystyrene.

Instrument: HLC-8320GPCEcoSEC manufactured by Tosoh Corporation

Column: TSK gel Super H M-H x 3 manufactured by Tosoh Corporation

Mobile phase solvent: THF
Flow rate: 0.6 mL/min
Temperature: 40° C.
Sample concentration: 0.1%
Sample injection amount: 10 µL
Detector: RI (UV)

[Pencil Hardness]

A plate test piece having a thickness of 2.0 mm was prepared, and pencil hardness with which no scratch was observed on the surface of the test piece was measured according to JIS K5600-5-4.

[Transparency]

The haze of a plate test piece having a thickness of 2.0 mm or 3.0 mm was measured using Haze meter NDH4000 (manufactured by Nippon Denshoku Industries Co., Ltd.) according to JIS K 7136.

[Yellowness Index]

The yellowness index (YI) of a plate test piece having a thickness of 2.0 mm or 3.0 mm was measured using Haze meter NDH4000 (manufactured by Nippon Denshoku Industries Co., Ltd.) according to JIS K 7136.

[Weathering Test]

A plate test piece having a thickness of 2.0 mm was put into a testing machine at 85° C. for 500 hours (without rain) to conduct a weathering test using Sunshine Weather Meter S80 (manufactured by Suga Test Instruments Co., Ltd.). After that, the yellowness index was measured according to the above-described yellowness index measurement method.

[Wet Heat Test]

Using a pressure cooker testing machine (manufactured by ESPEC CORP.), a plate test piece having a thickness of 2.0 mm was put into the testing machine under conditions of 105° C./100% RH for 24 hours to conduct a weathering test. After that, the haze was measured according to the above-described transparency measurement method.

Synthesis Example 1: Synthesis of (Meth)Acrylic Copolymer a 200 parts by mass of deionized water, 0.5 parts by mass of tricalcium phosphate as a suspension stabilizer and 0.01 parts by mass of sodium dodecylbenzene sulfonate as a surfactant were put into a heatable round-bottom separable flask equipped with a stirring device, and then the mixture was stirred. Concurrently, 20 parts by mass of 4-phenylbenzyl methacrylate (a1-1), 77 parts by mass of methyl methacrylate (a2-1), 3 parts by mass of methyl acrylate (a2-2), 0.15 parts by mass of 2,2-azobis(2-methylpropionitrile) as an initiator and 2.15 parts by mass of normal-octylmercaptan (nOM) as a chain transfer agent were mixed together to prepare a homogeneous monomer solution, which was put into the reactor. A reaction was carried out at 75° C. for 2 hours followed by 90° C. for 2 hours with nitrogen being flowed in the reactor to complete the polymerization reaction. The resulting bead-like polymer was washed with nitric acid, then washed with water and dried to obtain a (meth)acrylic copolymer a.

Synthesis Example 2: Synthesis of (Meth)Acrylic Copolymer b 200 parts by mass of deionized water, 0.5 parts by mass of tricalcium phosphate as a suspension stabilizer and 0.01 parts by mass of sodium dodecylbenzene sulfonate as a surfactant were put into a heatable round-bottom separable flask equipped with a stirring device, and then the mixture was stirred. Concurrently, 20 parts by mass of 4-phenylbenzyl methacrylate (a1-1), 77 parts by mass of methyl methacrylate (a2-1), 3 parts by mass of methyl acrylate (a2-2), 0.5 parts by mass of 2-[2'-hydroxy-5'-(methacryloyloxyethyl)phenyl]-2H-benzotriazole (a3-1), 0.15 parts by mass of 2,2-azobis(2-methylpropionitrile) as an initiator and 2.15 parts by mass of normal-octylmercaptan (nOM) as a chain transfer agent were mixed together to prepare a homogeneous monomer solution, which was put into the reactor. A reaction was carried out at 75° C. for 2 hours followed by 90° C. for 2 hours with nitrogen being flowed in the reactor to complete the polymerization reaction. The resulting bead-like polymer was washed with nitric acid, then washed with water and dried to obtain a (meth)acrylic copolymer b.

Synthesis Example 3: Synthesis of (Meth)Acrylic Copolymer c

A (meth)acrylic copolymer c was obtained in a manner similar to that in Synthesis Example 2, except that the amount of 2-[2'-hydroxy-5'-(methacryloyloxyethyl)phenyl]-2H-benzotriazole (a3-1) was 1 part by mass.

Synthesis Example 4: Synthesis of (Meth)Acrylic Copolymer

A (meth)acrylic copolymer d was obtained in a manner similar to that in Synthesis Example 2, except that the amount of 2-[2'-hydroxy-5'-(methacryloyloxyethyl)phenyl]-2H-benzotriazole (a3-1) was 2 parts by mass.

Synthesis Example 5: Synthesis of (Meth)Acrylic Copolymer e

A (meth)acrylic copolymer e was obtained in a manner similar to that in Synthesis Example 2, except that the amount of 2-[2'-hydroxy-5'-(methacryloyloxyethyl)phenyl]-2H-benzotriazole (a3-1) was 5 parts by mass.

Synthesis Example 6: Synthesis of (Meth)Acrylic Copolymer f

A (meth)acrylic copolymer f was obtained in a manner similar to that in Synthesis Example 2, except that the amount of 2-[2'-hydroxy-5'-(methacryloyloxyethyl)phenyl]-2H-benzotriazole (a3-1) was 15 parts by mass.

Synthesis Example 7: Synthesis of (Meth)Acrylic Copolymer g

A (meth)acrylic copolymer g was obtained in a manner similar to that in Synthesis Example 4, except that 1-naphthylmethyl methacrylate (a1-2) was used instead of 4-phenylbenzyl methacrylate (a1-1).

Synthesis Example 8: Synthesis of (Meth)Acrylic Copolymer h

A (meth)acrylic copolymer h was obtained in a manner similar to that in Synthesis Example 4, except that phenyl methacrylate (a1-3) was used instead of 4-phenylbenzyl methacrylate (a1-1) and that the amount of normal-octylmercaptan (nOM) as a chain transfer agent was 2.50 phr.

Synthesis Example 9: Synthesis of (Meth)Acrylic Copolymer i

A (meth)acrylic copolymer i was obtained in a manner similar to that in Synthesis Example 1, except that phenyl methacrylate (a1-3) was used instead of 4-phenylbenzyl methacrylate (a1-1), that 80 parts by mass of methyl methacrylate (a2-1) was used instead of 77 parts by mass of methyl methacrylate (a2-1) and 3 parts by mass of methyl acrylate (a2-2), and that the amount of normal-octylmercaptan (nOM) as a chain transfer agent was 2.50 phr.

Synthesis Examples 10-12: Synthesis of (Meth)Acrylic Copolymers j to l (Meth)acrylic copolymers j to l were obtained in a manner similar to that in Synthesis Example 2, except that the blending amounts of 4-phenylbenzyl methacrylate (a1-1), methyl methacrylate (a2-1), methyl acrylate (a2-2) and 2-[2'-hydroxy-5'-(methacryloyloxyethyl)phenyl]-2H-benzotriazole (a3-1) were as described in Table 1.

Synthesis Example 13: Synthesis of (Meth)Acrylic Copolymer m

A (meth)acrylic copolymer m was obtained in a manner similar to that in Synthesis Example 2, except that methyl acrylate (a2-2) was not blended, and that the blending amounts of 4-phenylbenzyl methacrylate (a1-1), methyl methacrylate (a2-1) and 2-[2'-hydroxy-5'-(methacryloyloxyethyl)phenyl]-2H-benzotriazole (a3-1) were as described in Table 1.

Synthesis Example 14: Synthesis of (Meth)Acrylic Copolymer n

A (meth)acrylic copolymer n was obtained in a manner similar to that in Synthesis Example 2, except that the blending amounts of 4-phenylbenzyl methacrylate (a1-1), methyl methacrylate (a2-1), methyl acrylate (a2-2) and 2-[2'-hydroxy-5'-(methacryloyloxyethyl)phenyl]-2H-benzotriazole (a3-1) were as described in Table 1, and that the amount of normal-octylmercaptan (nOM) as a chain transfer agent was 0.1 phr.

Synthesis Example 15: Synthesis of (Meth)Acrylic Copolymer o

A (meth)acrylic copolymer o was obtained in a manner similar to that in Synthesis Example 2, except that methyl methacrylate (a2-1) was not blended, that the blending amounts of 4-phenylbenzyl methacrylate (a1-1), methyl acrylate (a2-2) and 2-[2'-hydroxy-5'-(methacryloyloxyethyl)phenyl]-2H-benzotriazole (a3-1) were as described in Table 1, and that the amount of normal-octylmercaptan (nOM) as a chain transfer agent was 0.1 phr.

Synthesis Example 16: Synthesis of (Meth)Acrylic Copolymer p

A (meth)acrylic copolymer p was obtained in a manner similar to that in Synthesis Example 1, except that 4-phenylbenzyl methacrylate (a1-1) was not blended, and that the blending amounts of methyl methacrylate (a2-1) and methyl acrylate (a2-2) were as described in Table 1.

Synthesis Example 17: Synthesis of (Meth)Acrylic Copolymer q

A (meth)acrylic copolymer q was obtained in a manner similar to that in Synthesis Example 1, except that methyl acrylate (a2-2) was not blended, that the blending amounts of 4-phenylbenzyl methacrylate (a1-1) and methyl methacrylate (a2-1) were as described in Table 1, and that the amount of normal-octylmercaptan (nOM) as a chain transfer agent was 0.1 phr.

Synthesis Example 18: Synthesis of (Meth)Acrylic Copolymer r

A (meth)acrylic copolymer r was obtained in a manner similar to that in Synthesis Example 1, except that the blending amounts of 4-phenylbenzyl methacrylate (a1-1), methyl methacrylate (a2-1) and methyl acrylate (a2-2) were as described in Table 1, and that the amount of normal-octylmercaptan (nOM) as a chain transfer agent was 0.1 phr.

Synthesis Example 19: Synthesis of (Meth)Acrylic Copolymer s

A (meth)acrylic copolymer s was obtained in a manner similar to that in Synthesis Example 1, except that methyl methacrylate (a2-1) was not blended, that the blending amounts of 4-phenylbenzyl methacrylate (a1-1) and methyl acrylate (a2-2) were as described in Table 1, and that the amount of normal-octylmercaptan (nOM) as a chain transfer agent was 0.1 phr.

The compositions and mass-average molecular weights of the (meth)acrylic copolymers a to s obtained in the above-described Synthesis Examples 1-19 are shown in Table 1.

TABLE 1

| (Meth)acrylic copolymer | Composition of (meth)acrylic copolymer (parts by mass) | | | | | | Mass-average molecular weight (Mw) |
| --- | --- | --- | --- | --- | --- | --- | --- |
| | (a1) | | | (a2) | | (a3) | |
| | a1-1 | a1-2 | a1-3 | a2-1 | a2-2 | a3-1 | |
| a | 20 | | | 77 | 3 | | 11,300 |
| b | 20 | | | 77 | 3 | 0.5 | 11,400 |
| c | 20 | | | 77 | 3 | 1 | 11,100 |
| d | 20 | | | 77 | 3 | 2 | 11,000 |
| e | 20 | | | 77 | 3 | 5 | 11,700 |
| f | 20 | | | 77 | 3 | 15 | 12,100 |
| g | | 20 | | 77 | 3 | 2 | 11,200 |
| h | | | 20 | 77 | 3 | 2 | 13,700 |
| i | | | 20 | 80 | | | 14,100 |
| j | 10 | | | 87 | 3 | 1 | 11,000 |
| k | 15 | | | 82 | 3 | 1 | 11,000 |
| l | 30 | | | 67 | 3 | 1 | 11,500 |
| m | 80 | | | 20 | | 1 | 12,000 |
| n | 90 | | | 9 | 1 | 1 | 99,800 |
| o | 99 | | | | 1 | 1 | 101,100 |

TABLE 1-continued

| (Meth)acrylic copolymer | Composition of (meth)acrylic copolymer (parts by mass) | | | | | | Mass-average molecular weight (Mw) |
|---|---|---|---|---|---|---|---|
| | (a1) | | | (a2) | | (a3) | |
| | a1-1 | a1-2 | a1-3 | a2-1 | a2-2 | a3-1 | |
| p | | | | 97 | | 3 | 11,500 |
| q | 80 | | | 20 | | | 97,500 |
| r | 90 | | | 9 | | 1 | 105,100 |
| s | 99 | | | | | 1 | 103,400 |

Production Examples 1-24: Production of Resin Pellets 1-24

The (meth)acrylic copolymers obtained in the above-described Synthesis Examples, Iupilon (registered trademark) S-3000 (manufactured by Mitsubishi Engineering-Plastics Corporation, viscosity-average molecular weight: 22,000) (b-1) as a polycarbonate-based resin, Seesorb 709 (manufactured by Shipro Kasei Kaisha Ltd.) (c-1) as an ultraviolet absorber, ADEKA STAB AO-60 (manufactured by ADEKA Corporation) (d-1) as a phenol-based antioxidant and ADEKA STAB 2112 (manufactured by ADEKA Corporation) (d-2) as a phosphite-based antioxidant were blended at mass ratios shown in Table 2 below. After mixing in a tumbler for 20 minutes, the resultant was supplied into "TEX30HSST" manufactured by The Japan Steel Works, Ltd. equipped with a single vent, and kneaded under the conditions of a screw rotation speed of 200 rpm, a discharge rate of 20 kg/hour and a barrel temperature of 260° C. A molten resin extruded into a strand was rapidly cooled in a water tank, and pelletized using a pelletizer, thereby obtaining pellets of the resin composition.

Tests 1-4 were conducted using the resin pellets 1-24 obtained in the aforementioned Production Examples.

<Evaluation>

[Test 1: Evaluation of Injection Speed and Haze]

The pellets obtained by the above-described production method were dried at 100° C. for 5 hours and then subjected to injection molding in an injection molding machine ("SE50DUZ" manufactured by Sumitomo Heavy Industries, Ltd.) using a steel mold at the following injection temperature and injection speed, and a mold temperature of 80° C., thereby obtaining a plate test piece of 50×90× thickness 3.0 mm.

Injection conditions I: injection temperature 280° C., injection speed 50 mm/sec Injection conditions II: injection temperature 280° C., injection speed 300 mm/sec Using the plate test piece obtained under Injection conditions I or Injection conditions II above, the transparency (haze) after injection molding was measured according to the above-described method. The results are shown in Table 3.

[Test 2: Pencil Hardness, Weathering Test, Wet Heat Test]

The pellets obtained by the above-described production method were dried at 100° C. for 5 hours and then subjected to injection molding in an injection molding machine ("SE18DUZ" manufactured by Sumitomo Heavy Industries, Ltd.) using a steel mold at an injection temperature of 280° C., an injection speed of 50 mm/sec and a mold temperature of 80° C., thereby obtaining a plate test piece of 40×40× thickness 2.0 mm.

Using the obtained plate test piece, the pencil hardness, the transparency (haze) and yellowness index (YI) after injection molding, the yellowness index (YI) after the weathering test and the transparency (haze) after the wet heat test were measured according to the above-described methods. Further, the value obtained by subtracting the value of the yellowness index after injection molding from the value of the yellowness index after the weathering test (ΔYI) was calculated. The results are shown in Table 4.

[Test 3: Retention Heat Stability]

The pellets obtained by the above-described production method were dried at 100° C. for 5 hours and then subjected to injection molding (10 shots) in an injection molding machine ("SE50DUZ" manufactured by Sumitomo Heavy Industries, Ltd.) using a steel mold at an injection temperature of 280° C., an injection speed of 50 mm/sec and a mold temperature of 80° C., and with a cycle time of 180 seconds, thereby obtaining plate test pieces of 50×90× thickness 3.0 mm. The yellowness index (YI) of each of the injection-molded pieces of the first shot and the tenth shot obtained was measured according to the above-described yellowness index measurement method, and the value obtained by subtracting the value of the yellowness index of the first shot from the value of the yellowness index of the tenth shot (ΔYI) was calculated. The results are shown in Table 3.

[Test 4: Mold Contamination Property]

The pellets obtained by the above-described production method were dried at 100° C. for 5 hours and then subjected to injection molding in an injection molding machine ("SE7M" manufactured by Sumitomo Heavy Industries, Ltd.) using a drop-shaped mold at an injection temperature of 280° C. and a mold temperature of 80° C. (continuous molding of 3000 shots). After molding was completed, the state of the internal surface of the mold was observed macroscopically. In this regard, evaluation regarding mold contamination property was as described below.

A: There is almost no mold deposit and the effect of suppressing mold contamination is very good.

B: Though there is a small amount of a mold deposit, the effect of suppressing mold contamination is good.

C: There is a large amount of a mold deposit and the effect of suppressing mold contamination is poor.

The results are shown in Table 3.

TABLE 2

| | Resin component | | | | Antioxidant (D) | | | |
|---|---|---|---|---|---|---|---|---|
| | (Meth)acrylic copolymer | | | | | | | |
| Pellet No. | (M1) (Unit (a3) is contained) | (M2) (Unit (a3) is not contained) | Polycarbonate-based resin (B) | Content ratio*1 (M1)/(M2)/(B) | Ultraviolet absorber (C) c-1*2 | Phenol-based d-1*2 | Phosphite-based d-2*2 | |
| 1 | — | a | b-1 | 0/30/70 | 0.3 | 0.1 | 0.03 | Comparative Example |
| 2 | — | a | b-1 | 0/30/70 | 0.6 | 0.1 | 0.03 | Comparative Example |
| 3 | b | — | b-1 | 30/0/70 | 0.3 | 0.1 | 0.03 | Example |
| 4 | c | — | b-1 | 30/0/70 | 0.3 | 0.1 | 0.03 | Example |

TABLE 2-continued

| | Resin component | | | | | Antioxidant (D) | | | |
|---|---|---|---|---|---|---|---|---|---|
| | (Meth)acrylic copolymer | | | | | | | | |
| Pellet No. | (M1) (Unit (a3) is contained) | (M2) (Unit (a3) is not contained) | Polycarbonate-based resin (B) | Content ratio*[1] (M1)/(M2)/(B) | Ultraviolet absorber (C) c-1*[2] | Phenol-based d-1*[2] | Phosphite-based d-2*[2] | | |
| 5 | d | — | b-1 | 30/0/70 | 0 | 0.2 | 0.03 | Example |
| 6 | d | — | b-1 | 30/0/70 | 0.3 | 0.1 | 0.03 | Example |
| 7 | d | — | b-1 | 30/0/70 | 0.3 | 0.2 | 0.03 | Example |
| 8 | e | — | b-1 | 30/0/70 | 0.3 | 0.1 | 0.03 | Example |
| 9 | f | — | b-1 | 30/0/70 | 0.3 | 0.1 | 0.03 | Comparative Example |
| 10 | g | — | b-1 | 30/0/70 | 0.3 | 0.1 | 0.03 | Example |
| 11 | h | — | b-1 | 30/0/70 | 0.3 | 0.1 | 0.03 | Example |
| 12 | — | — | b-1 | 0/0/100 | 0.3 | 0.1 | 0.03 | Comparative Example |
| 13 | c | i | b-1 | 15/15/70 | 0.3 | 0.1 | 0.03 | Example |
| 14 | c | p | b-1 | 15/15/70 | 0.3 | 0.1 | 0.03 | Example |
| 15 | j | | b-1 | 30/0/70 | 0.3 | 0.1 | 0.03 | Example |
| 16 | k | | b-1 | 30/0/70 | 0.3 | 0.1 | 0.03 | Example |
| 17 | l | | b-1 | 30/0/70 | 0.3 | 0.1 | 0.03 | Example |
| 18 | m | | b-1 | 30/0/70 | 0.3 | 0.1 | 0.03 | Example |
| 19 | n | p | b-1 | 5/25/70 | 0.3 | 0.1 | 0.03 | Example |
| 20 | n | p | b-1 | 15/15/70 | 0.3 | 0.1 | 0.03 | Example |
| 21 | o | p | b-1 | 5/25/70 | 0.3 | 0.1 | 0.03 | Example |
| 22 | | q, p | b-1 | 0/5, 25/70 | 0.3 | 0.1 | 0.03 | Comparative Example |
| 23 | | r, p | b-1 | 0/5, 25/70 | 0.3 | 0.1 | 0.03 | Comparative Example |
| 24 | | s, p | b-1 | 0/5, 25/70 | 0.3 | 0.1 | 0.03 | Comparative Example |

*[1]Content ratio (M1)/(M2)/(B) shows respective content ratios (% by mass) of the (meth)acrylic copolymer containing the unit (a3) (M1), the (meth)acrylic copolymer not containing the unit (a3) (M2) and the polycarbonate-based resin (B) relative to the whole resin component (100% by mass). Further, Nos. 22-24 contain, as (M2), the (meth)acrylic copolymer q, r or s in an amount of 5% by mass and the (meth)acrylic copolymer p in an amount of 25% by mass relative to the whole resin component (100% by mass).
*[2]The contents of the ultraviolet absorber (C) and the antioxidant (D) show adding amounts (parts by mass) relative to the resin component (100 parts by mass).

TABLE 3

| | Test 1: Relationship between injection conditions and haze | | Test 3: Retention heat stability | | Test 4: Mold | | |
|---|---|---|---|---|---|---|---|
| | Injection conditions I | Injection conditions II | | | | | |
| Pellet No. | (280° C. · 50 mm/sec) Haze (3 mmt) | (280° C. · 300 mm/sec) Haze (3 mmt) | First shot YI (3 mmt) | Tenth shot YI (3 mmt) | ΔYI (3 mmt) | contamination property | |
| 1 | 0.8 | 1.9 | 1.7 | 2.4 | 0.7 | A | Comparative Example |
| 2 | 0.8 | 1.8 | 1.8 | 3.0 | 1.2 | B | Comparative Example |
| 3 | 0.8 | 1.3 | 1.7 | 2.3 | 0.6 | A | Example |
| 4 | 0.9 | 1.2 | 1.8 | 2.3 | 0.5 | A | Example |
| 5 | 0.8 | 1.1 | 1.8 | 2.1 | 0.3 | A | Example |
| 6 | 0.8 | 1.0 | 1.7 | 2.2 | 0.5 | A | Example |
| 7 | 0.9 | 1.1 | 1.7 | 2.4 | 0.7 | A | Example |
| 8 | 0.8 | 1.0 | 2.5 | 3.9 | 1.4 | A | Example |
| 9 | 0.8 | 0.9 | 4.2 | 6.0 | 1.8 | A | Comparative Example |
| 10 | 1.0 | 1.5 | 1.9 | 3.5 | 1.6 | A | Example |
| 11 | 0.8 | 3.0 | 1.6 | 1.9 | 0.3 | A | Example |
| 12 | 0.7 | 0.9 | 1.5 | 1.7 | 0.2 | A | Comparative Example |
| 13 | 0.7 | 1.9 | 1.8 | 2.1 | 0.3 | A | Example |
| 14 | 0.8 | 2.9 | 1.8 | 2.0 | 0.2 | A | Example |
| 15 | 1.0 | 2.8 | 1.6 | 2.0 | 0.4 | A | Example |
| 16 | 0.9 | 1.4 | 1.8 | 2.3 | 0.5 | A | Example |
| 17 | 0.9 | 1.1 | 2.0 | 2.9 | 0.9 | A | Example |
| 18 | 1.5 | 1.8 | 2.5 | 3.8 | 1.3 | A | Example |
| 19 | 1.2 | 2.9 | 2.0 | 2.8 | 0.8 | A | Example |
| 20 | 1.1 | 2.8 | 2.2 | 3.6 | 1.4 | A | Example |
| 21 | 0.9 | 2.0 | 2.4 | 3.5 | 1.1 | A | Example |
| 22 | 1.3 | 3.3 | 3.0 | 5.6 | 2.6 | A | Comparative Example |
| 23 | 1.4 | 3.3 | 3.3 | 6.9 | 3.6 | A | Comparative Example |
| 24 | 1.6 | 3 | 3.4 | 7.8 | 4.4 | A | Comparative Example |

TABLE 4

| Pellet No. | After injection molding YI (2 mmt) | Test 2: Weathering test | | | | Test 2: Wet heat test | | Test 2: Pencil hardness | |
|---|---|---|---|---|---|---|---|---|---|
| | | After weathering test (220 hr) | After weathering test (500 hr) | ΔYI (2 mmt) YI (500 hr) − YI (0 hr) | ΔYI (2 mmt) YI (220 hr) − YI (0 hr) | After injection molding Haze (2 mmt) | After pressure cooker (24 hr) | | |
| 1  | 2.1 |     | 12.9 | 10.8 |      | 3.3 | 8.2  | F  | Comparative Example |
| 2  | 2.2 |     | 9.7  | 7.5  |      | 3.2 | 12.0 | F  | Comparative Example |
| 3  | 2.0 |     | 10.5 | 8.5  |      | 2.9 | 3.9  | F  | Example |
| 4  | 2.0 |     | 10.2 | 8.2  |      | 3.0 | 4.5  | F  | Example |
| 5  | 2.5 |     | 9.8  | 7.3  |      | 2.7 | 3.8  | F  | Example |
| 6  | 2.5 |     | 10.2 | 7.7  |      | 2.9 | 4.2  | F  | Example |
| 7  | 2.6 |     | 8.3  | 5.7  |      | 3.0 | 5.0  | F  | Example |
| 8  | 3.2 |     | 8.6  | 5.4  |      | 2.8 | 4.8  | F  | Example |
| 9  | 5.1 |     | 9.1  | 4.0  |      | 2.9 | 4.9  | F  | Comparative Example |
| 10 | 3.0 |     | 11.9 | 8.9  |      | 2.9 | 4.3  | F  | Example |
| 11 | 2.0 |     | 7.0  | 5.0  |      | 3.0 | 4.4  | F  | Example |
| 12 | 1.9 |     | 7.4  | 5.5  |      | 1.8 | 1.9  | 2B | Comparative Example |
| 13 | 2.0 |     | 9.5  | 7.5  |      | 3.0 | 3.5  | F  | Example |
| 14 | 1.9 |     | 8.9  | 7.0  |      | 3.2 | 3.9  | F  | Example |
| 15 | 1.8 |     | 8.5  | 6.7  |      | 2.8 | 4.3  | F  | Example |
| 16 | 1.9 |     | 9.2  | 7.3  |      | 2.8 | 4.0  | F  | Example |
| 17 | 2.5 |     | 11.5 | 9.0  |      | 2.7 | 4.9  | F  | Example |
| 18 | 3.0 | 7.0 | 12.0 | 9.0  | 4.0  | 3.5 | 5.5  | F  | Example |
| 19 | 2.6 | 6.9 | 12.1 | 9.5  | 4.3  | 3.4 | 4.0  | F  | Example |
| 20 | 2.9 |     | 14.4 | 11.5 |      | 3.2 | 5.9  | HB | Example |
| 21 | 3.1 | 8.5 | 13.6 | 10.5 | 5.4  | 3.2 | 4.1  | F  | Example |
| 22 | 3.3 | 9.9 |      |      | 6.6  |     |      | F  | Comparative Example |
| 23 | 3.1 | 12.8|      |      | 9.7  |     |      | F  | Comparative Example |
| 24 | 3.8 | 15.0|      |      | 11.2 |     |      | F  | Comparative Example |

As shown in Tables 3 and 4, when injection-molding the resin compositions obtained by blending the polycarbonate-based resin (B) and the (meth)acrylic copolymer (b to e, g, h, j to o), which contains the aromatic (meth)acrylate unit (a1), the methyl (meth)acrylate unit (a2) and the (meth)acrylate unit (a3) having the ultraviolet-absorbing group, wherein: the mass ratio (a1)/(a2) is from 5/95 to 99/1; and the content of the unit (a3) is 0.1 to 10 parts by mass relative to 100 parts by mass of the total of the units (a1) and (a2) (Pellet Nos. 3-8, 10, 11 and 13-21), high transparency was maintained even when a high injection speed and a high injection temperature were employed, while the surface hardness was ensured; the thermal stability and mold contamination property were excellent; and the transparency was high even after the wet heat test.

When injection-molding the resin compositions obtained by blending the polycarbonate-based resin (B) and the (meth)acrylic copolymer (b to e, g, h to m), which contains the aromatic (meth)acrylate unit (a1), the methyl (meth)acrylate unit (a2) and the (meth)acrylate unit (a3) having the ultraviolet-absorbing group, wherein: the mass ratio (a1)/(a2) is from 5/95 to 85/15; and the content of the unit (a3) is 0.1 to 10 parts by mass relative to 100 parts by mass of the total of the units (a1) and (a2) (Pellet Nos. 3-8, 10, 11 and 13-18), the surface hardness was high; the transparency was high even when a high injection speed and a high injection temperature were employed; the thermal stability and mold contamination property were excellent; the yellowness index after molding was low; the yellowing degree after the weathering test was low; and the transparency was high even after the wet heat test.

It can be confirmed that there is a tendency that the higher the content of the unit (a1) is, the more the transparency in the case of employing a high injection speed and a high injection temperature is improved (comparison of Test 1 (Injection conditions II) of Pellet Nos. 4 and 15-17). Meanwhile, it can be confirmed that there is a tendency that the higher the content of the unit (a1) is, the more the retention heat stability is reduced (comparison of Test 3 of Pellet Nos. 4 and 15-17). In particular, it is confirmed that the transparency and retention heat stability at the time of injection molding at a high temperature/high speed are particularly excellent in the case where (a1)/(a2) is from 15/85 to 25/75 when compared to another case in which the production was carried out under the same conditions (comparison of Test 1 and Test 3 (Pellet Nos. 4 and 16 vs Pellet Nos. 15 and 17)).

It is confirmed that the above-described excellent effects were also obtained, in particular, the balance between weather resistance, retention heat stability and transparency at the time of injection molding at a high temperature/high speed was particularly excellent in the case where, as the (meth)acrylic copolymer, in addition to the (meth)acrylate copolymer (c) containing the unit (a3), the additional aromatic (meth)acrylate copolymer (i) not containing the unit (a3) ((meth)acrylic copolymer (E) which contains the methyl (meth)acrylate unit as the main component and further contains the phenyl methacrylate unit (the unit represented by formula (4)) is further contained (Pellet No. 13).

Further, it is confirmed that the above-described excellent effects were also obtained in the case where, as the (meth)acrylic copolymer, in addition to the (meth)acrylate copolymer (c, n, o) containing the unit (a3), the additional (meth)acrylate copolymer (p) not containing the unit (a3) ((meth)acrylic copolymer (E) composed of the methyl (meth)acrylate) is further contained (Pellet Nos. 14 and 19-21).

There is a tendency that when the unit (a3) increases, the transparency at the time of injection molding at a high temperature/high speed and high transparency after the wet heat test (haze after pressure cooker of Test 2) are improved. Meanwhile, there is a tendency that when the unit (a3) increases, the hue after molding (YI of the first shot of Test 3) is deteriorated. It is confirmed that in the case of using the (meth)acrylic copolymer (b to d, g, h, j to o), wherein the content of the unit (a3) is 0.1 to 4 parts by mass relative to 100 parts by mass of the total of the units (a1) and (a2) (Pellet Nos. 3-7, 10, 11, 13-21), the transparency at the time of injection molding at a high temperature/high speed and transparency after the wet heat test are improved while the hue after molding (YI of the first shot of Test 3) is ensured.

It is confirmed that particularly in the case of using the (meth)acrylic copolymer, wherein: (a1)/(a2) is from 15/85 to 25/75; and the content of the unit (a3) is 0.1 to 4 parts by mass relative to 100 parts by mass of the total of the units (a1) and (a2) (preferably in the case where (a1) is the unit of formula (3); for example, Pellet Nos. 3-7, 13, 14, 16), the balance between the transparency at the time of injection molding at a high temperature/high speed, retention heat stability, weather resistance and moist heat resistance is particularly excellent.

It is confirmed that the smaller the total adding amount of the ultraviolet absorber (C) and the antioxidant (D) is, the higher the transparency after the wet heat test (haze after pressure cooker of Test 2) is (for example, comparison between Pellet Nos. 5, 6 and 7).

It is confirmed that particularly excellent transparency is obtained even in the case of high-speed injection molding (haze of Injection conditions II of Test 1) when using, as the aromatic (meth)acrylate unit, a unit having two or more benzene rings in the ester moiety thereof (formula (3) or (5) above) when compared to the case of using a unit having one benzene ring in the ester moiety thereof (formula (4) above) under the same conditions (Pellet Nos. 6 and 10 vs Pellet No. 11). In particular, when using a unit having two or more benzene rings (monocycles) in the ester moiety thereof (formula (3) above), particularly excellent transparency is obtained, and moist heat resistance is improved.

Meanwhile, in the case of the resin composition obtained by blending the polycarbonate-based resin and the (meth)acrylic copolymer (a) not containing the (meth)acrylate unit (a3) (Pellet Nos. 1 and 2), the transparency after the wet heat test (Test 2: haze after pressure cooker (24 hr)) was reduced. Further, the resin composition had a tendency that transparency is reduced when a high injection speed and a high injection temperature are employed. Moreover, the resin composition had a difficulty in achieving a balance between the weather resistance, thermal stability and mold contamination property. Specifically, when the (meth)acrylate unit (a3) was not contained and the amount of the ultraviolet absorber was 0.6 parts by mass relative to 100 parts by mass of the resin component (Pellet No. 2), color change due to the weathering test was at a predetermined level or lower, but thermal stability and mold contamination resistance were deteriorated. Meanwhile, when the (meth)acrylate unit (a3) was not contained and the amount of the ultraviolet absorber was 0.3 parts by mass relative to 100 parts by mass of the resin component (Pellet No. 1), thermal stability and mold contamination resistance were ensured, but the yellowing degree after the weathering test ($\Delta$YI) was high.

Regarding the mixture of the aromatic (meth)acrylic copolymer and the additional (meth)acrylic copolymer (E), in the case of using the (meth)acrylic copolymer containing the (meth)acrylate unit (a3) (n, o) (Pellet Nos. 19-21), the yellowing degree after the weathering test ($\Delta$YI) was lower and retention heat stability was improved when compared to the case of using the aromatic methacrylic copolymer (q, r, s), which has a similar composition except that the (meth)acrylate unit (a3) is not contained (Pellet Nos. 22-24).

It was confirmed that in the case of using the (meth)acrylic copolymer (f), wherein the content of the (meth)acrylate unit (a3) is more than 10 parts by mass based on 100 parts by mass of the total of the units (a1) and (a2) (Pellet No. 9), the hue after molding (YI of the first shot of Test 3) and the hue due to retention at the time of molding (YI of the tenth shot of Test 3, $\Delta$YI) were deteriorated.

In the case where the aromatic (meth)acrylate copolymer (a) was not contained (Pellet No. 12), it was impossible to obtain sufficient surface hardness.

The invention claimed is:

1. A (meth)acrylic copolymer, which contains an aromatic (meth)acrylate unit (a1), a methyl (meth)acrylate unit (a2) and a (meth)acrylate unit (a3) represented by formula (1) below; wherein: the mass ratio (a1)/(a2) is from 5/95 to 99/1; and the unit (a1) is different from the unit (a3):

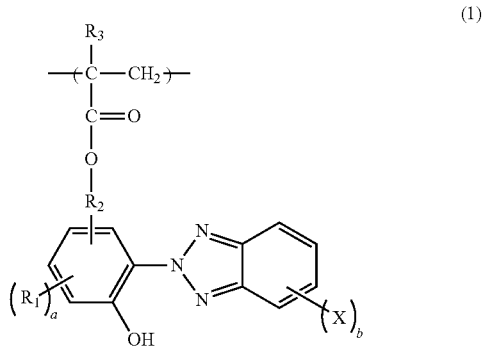

wherein:

X represents a halogen atom or a $C_{1-10}$ alkyl group;

$R_1$ represents a $C_{1-10}$ alkyl group;

$R_2$ represents a single bond, a $C_{1-10}$ alkylene group, a $C_{1-10}$ oxyalkylene group or a $C_{1-10}$ hydroxyoxyalkylene group;

$R_3$ represents a hydrogen atom or a methyl group;

a represents an integer of 0 to 3;

b represents an integer of 0 to 4; and wherein the content of the unit (a3) is 0.1 to 4 parts by mass relative to 100 parts by mass of the total of the units (a1) and (a2);

wherein the unit (a1) contains a structural unit represented by any one of formula (3) to formula (5):

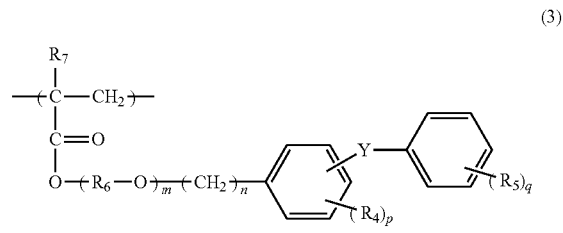

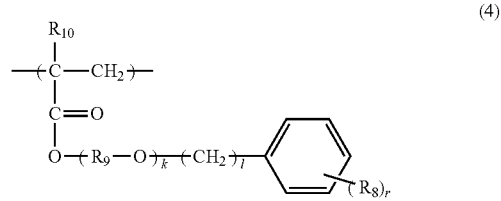

-continued

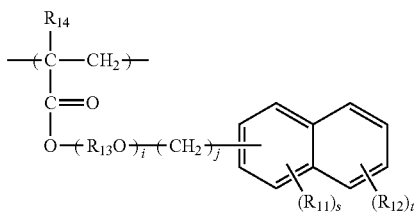
(5)

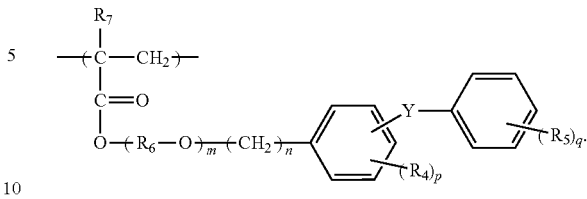
(3)

wherein in formula (3) to formula (5):

Y represents a single bond, or a divalent group selected from the group consisting of —C($R_{15}$)($R_{16}$)—, —C(=O)—, —O—, —OC(=O)—, —OC(=O)O—, —S—, —SO—, —$SO_2$— and any combination thereof;

$R_4$ and $R_5$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;

$R_6$ represents a branched or unbranched $C_{2-6}$ alkylene group, a $C_{6-10}$ cycloalkylene group or a $C_{6-10}$ arylene group;

$R_7$ represents a hydrogen atom or a methyl group;

$R_8$ represents a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group or a halogen atom;

$R_9$ represents a branched or unbranched $C_{2-6}$ alkylene group, a $C_{6-10}$ cycloalkylene group or a $C_{6-10}$ arylene group;

$R_{10}$ represents a hydrogen atom or a methyl group;

$R_{11}$ and $R_{12}$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;

$R_{13}$ represents a branched or unbranched $C_{2-6}$ alkylene group, a $C_{6-10}$ cycloalkylene group or a $C_{6-10}$ arylene group;

$R_{14}$ represents a hydrogen atom or a methyl group;

$R_{15}$ and $R_{16}$ each independently represent a hydrogen atom, a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a phenyl group or a phenylphenyl group, or $R_{15}$ and $R_{16}$ may be bonded to each other to form a $C_{3-10}$ cyclic alkyl group together with a carbon atom to which they are attached;

m represents an integer of 0 to 10;
n represents an integer of 1 or 2;
k represents an integer of 1 to 3;
l represents an integer of 0 to 2;
i represents an integer of 1 to 3;
j represents an integer of 0 to 2;
p represents an integer of 0 to 4;
q represents an integer of 0 to 5;
r represents an integer of 0;
s represents an integer of 0; and
t represents an integer of 0.

2. The (meth)acrylic copolymer according to claim 1, wherein the unit (a1) contains a structural unit represented by formula (3):

3. A resin composition which contains the (meth)acrylic copolymer according to claim 1.

4. The (meth)acrylic copolymer according to claim 1, wherein the unit (a3) contains a structural unit represented by formula (2):

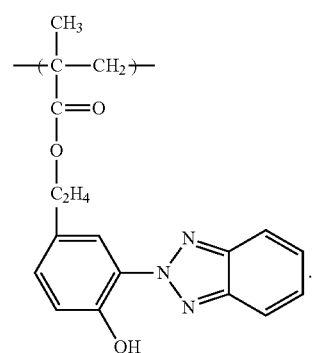
(2)

5. The (meth)acrylic copolymer according to claim 1, wherein the (meth)acrylic copolymer has a mass-average molecular weight of 3,000 to 1,000,000.

6. The (meth)acrylic copolymer according to claim 1, wherein the unit (a1) is represented by the formula (3); and in the formula (3), m represents an integer of 1 to 3.

7. The (meth)acrylic copolymer according to claim 1, wherein the unit (a1) is represented by the formula (3); and in the formula (3), Y represents a single bond, —C($R_{15}$)($R_{16}$)—, —C(=O)—, —O—, —SO— or —$SO_2$—.

8. The (meth)acrylic copolymer according to claim 1, wherein the unit (a1) is represented by the formula (3); and in the formula (3), both p and q are 0.

9. The (meth)acrylic copolymer according to claim 1, wherein the unit (a1) is represented by the formula (4); and in the formula (4), k represents an integer of 1 to 3, and r is 0.

10. The (meth)acrylic copolymer according to claim 1, wherein the unit (a1) is represented by the formula (5); and in the formula (5), i represents an integer of 1 to 3, and both s and t are 0.

11. The (meth)acrylic copolymer according to claim 1, wherein the mass ratio (a1)/(a2) is from 5/95 to 85/15.

12. The (meth)acrylic copolymer according to claim 1, wherein the mass ratio (a1)/(a2) is from 5/95 to 40/60.

13. A (meth)acrylic copolymer, which contains an aromatic (meth)acrylate unit (a1), a methyl (meth)acrylate unit (a2) and a (meth)acrylate unit (a3) represented by formula (1) below, wherein: the mass ratio (a1)/(a2) is from 5/95 to 99/1; the content of the unit (a3) is 0.1 to 10 parts by mass relative to 100 parts by mass of the total of the units (a1) and (a2); and the unit (a1) is different from the unit (a3):

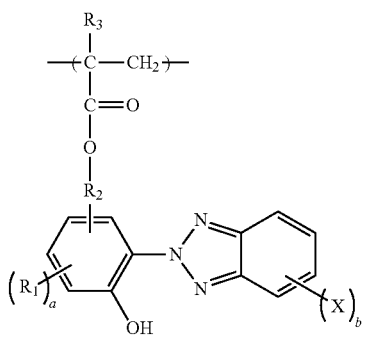
(1)

wherein:
X represents a halogen atom or a $C_{1-10}$ alkyl group;
$R_1$ represents a $C_{1-10}$ alkyl group;
$R_2$ represents a single bond, a $C_{1-10}$ alkylene group, a $C_{1-10}$ oxyalkylene group or a $C_{1-10}$ hydroxyoxyalkylene group;
$R_3$ represents a hydrogen atom or a methyl group;
a represents an integer of 0 to 3;
b represents an integer of 0 to 4;
wherein the unit (a1) contains a structural unit represented by formula (5):

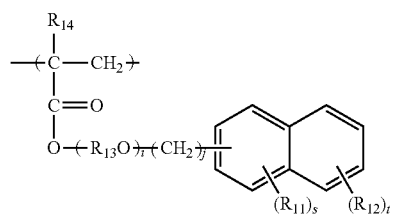
(5)

wherein in formula (5):
$R_{11}$ and $R_{12}$ each independently represent a $C_{1-10}$ linear alkyl group, a $C_{3-10}$ branched alkyl group, a $C_{3-10}$ cyclic alkyl group, a $C_{1-10}$ linear alkoxy group, a $C_{3-10}$ branched alkoxy group, a $C_{3-10}$ cyclic alkoxy group, a halogen atom, a phenyl group or a phenylphenyl group;
$R_{13}$ represents a branched or unbranched $C_{2-6}$ alkylene group, a $C_{6-10}$ cycloalkylene group or a $C_{6-10}$ arylene group;
$R_{14}$ represents a hydrogen atom or a methyl group;
i represents an integer of 1 to 3;
j represents an integer of 0 to 2; and
both s and t are 0.

14. A resin composition which contains a (meth)acrylic copolymer (A) and a polycarbonate-based resin (B), wherein:
the (meth)acrylic copolymer (A) contains an aromatic (meth)acrylate unit (a1), a methyl (meth)acrylate unit (a2) and a (meth)acrylate unit (a3) represented by formula (1) below; the mass ratio (a1)/(a2) is from 5/95 to 99/1; and the unit (a1) is different from the unit (a3):

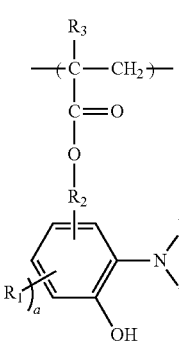
(1)

wherein:
X represents a halogen atom or a $C_{1-10}$ alkyl group;
$R_1$ represents a $C_{1-10}$ alkyl group;
$R_2$ represents a single bond, a $C_{1-10}$ alkylene group, a $C_{1-10}$ oxyalkylene group or a $C_{1-10}$ hydroxyoxyalkylene group;
$R_3$ represents a hydrogen atom or a methyl group;
a represents an integer of 0 to 3; and
b represents an integer of 0 to 4; and
wherein the content of the unit (a3) is 0.1 to 4 parts by mass relative to 100 parts by mass of the total of the units (a1) and (a2);
wherein the unit (a1) contains a structural unit represented by any one of formula (3) to formula (5):

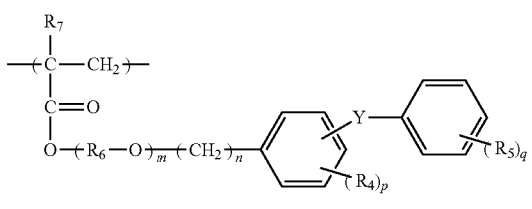
(3)

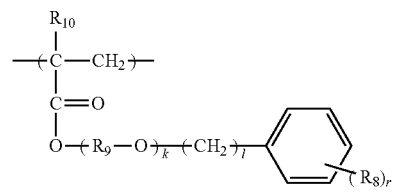
(4)

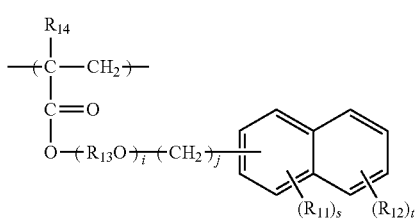
(5)

wherein in formula (3) to formula (5):
Y represents a single bond, or a divalent group selected from the group consisting of —C(R15)(R16)—, —C(=O)—, —O—, —OC(=O)—, —OC(=O)O—, —S—, —SO—, —SO2— and any combination thereof;
R4 and R5 each independently represent a C1-10 linear alkyl group, a C3-10 branched alkyl group, a C3-10 cyclic alkyl group, a C1-10 linear alkoxy group, a C3-10 branched alkoxy group, a C3-10 cyclic alkoxy group, a halogen atom, a phenyl group or a phenylphenyl group;

R6 represents a branched or unbranched C2-6 alkylene group, a C6-10 cycloalkylene group or a C6-10 arylene group;

R7 represents a hydrogen atom or a methyl group;

R8 represents a C1-10 linear alkyl group, a C3-10 branched alkyl group, a C3-10 cyclic alkyl group, a C1-10 linear alkoxy group, a C3-10 branched alkoxy group, a C3-10 cyclic alkoxy group or a halogen atom;

R9 represents a branched or unbranched C2-6 alkylene group, a C6-10 cycloalkylene group or a C6-10 arylene group;

R10 represents a hydrogen atom or a methyl group;

R11 and R12 each independently represent a C1-10 linear alkyl group, a C3-10 branched alkyl group, a C3-10 cyclic alkyl group, a C1-10 linear alkoxy group, a C3-10 branched alkoxy group, a C3-10 cyclic alkoxy group, a halogen atom, a phenyl group or a phenylphenyl group;

R13 represents a branched or unbranched C2-6 alkylene group, a C6-10 cycloalkylene group or a C6-10 arylene group;

R14 represents a hydrogen atom or a methyl group;

R15 and R16 each independently represent a hydrogen atom, a C1-10 linear alkyl group, a C3-10 branched alkyl group, a C3-10 cyclic alkyl group, a C1-10 linear alkoxy group, a C3-10 branched alkoxy group, a C3-10 cyclic alkoxy group, a phenyl group or a phenylphenyl group, or R15 and R16 may be bonded to each other to form a C3-10 cyclic alkyl group together with a carbon atom to which they are attached;

m represents an integer of 0 to 10;
n represents an integer of 1 or 2;
k represents an integer of 1 to 3;
l represents an integer of 0 to 2;
i represents an integer of 1 to 3;
j represents an integer of 0 to 2;
p represents an integer of 0 to 4;
q represents an integer of 0 to 5;
r represents an integer of 0;
s represents an integer of 0; and
t represents an integer of 0.

15. The resin composition according to claim 14, wherein the unit (a3) contains a structural unit represented by formula (2):

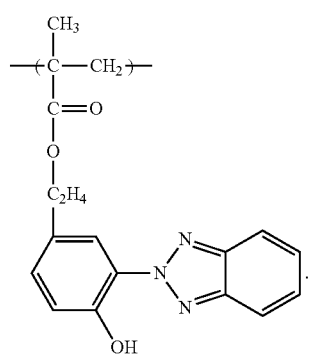

(2)

16. The resin composition according to claim 14, wherein the (meth)acrylic copolymer (A) has a mass-average molecular weight of 3,000 to 1,000,000.

17. The resin composition according to claim 14, which contains an ultraviolet absorber (C) in an amount of 0 to 0.5 parts by mass relative to 100 parts by mass of a resin component that contains the (meth)acrylic copolymer (A) and the polycarbonate-based resin (B).

18. The resin composition according to claim 17, wherein the ultraviolet absorber (C) comprises at least one of a benzotriazole-based compound, a triazine-based compound and a benzoxazinone-based compound.

19. The resin composition according to claim 14, which contains an antioxidant (D) in an amount of 0.05 to 1.0 parts by mass relative to 100 parts by mass of the resin component that contains the (meth)acrylic copolymer (A) and the polycarbonate-based resin (B).

20. The resin composition according to claim 19, wherein the antioxidant (D) comprises a phenol-based antioxidant or a phosphite-based antioxidant.

21. The resin composition according to claim 14, wherein the unit (a1) is represented by the formula (3).

22. The resin composition according to claim 14, wherein in the resin component, the content of the (meth)acrylic copolymer (A) is 5 to 60% by mass, and the content of the polycarbonate-based resin (B) is 40 to 95% by mass.

23. The resin composition according to claim 14, wherein the mass ratio (a1)/(a2) is from 5/95 to 85/15.

24. The resin composition according to claim 14, which further contains a (meth)acrylic copolymer (E) that is different from the (meth)acrylic copolymer (A) wherein in the resin component, the content of the (meth)acrylic copolymer (A) is 5 to 40% by mass, the content of the polycarbonate-based resin (B) is 40 to 95% by mass and the content of the (meth)acrylic copolymer (E) is 0 to 30% by mass.

25. The resin composition according to claim 24, wherein the (meth)acrylic copolymer (E) contains 10 to 85% by mass of a (meth)acrylate unit (e1) represented by general formula (6) below and 15 to 90% by mass of a methyl (meth)acrylate unit (e2):

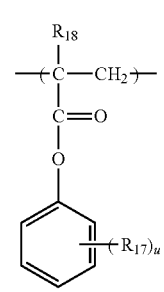

(6)

wherein:
R$_{17}$ each independently represents a C$_{1-10}$ linear alkyl group, a C$_{3-10}$ branched alkyl group, a C$_{3-10}$ cyclic alkyl group, a C$_{1-10}$ linear alkoxy group, a C$_{3-10}$ branched alkoxy group, a C$_{3-10}$ cyclic alkoxy group, a halogen atom, a substituted or unsubstituted phenyl group or a substituted or unsubstituted phenylphenyl group;
R$_{18}$ represents a hydrogen atom or a methyl group; and
u represents an integer of 0 to 5.

26. A molded body formed by using the resin composition according to claim 14.

27. A method for producing a molded body, wherein the resin composition according to claim 14 is injection-molded.

28. The resin composition according to claim 14, wherein
   (i) the unit (a1) is represented by the formula (3); and in the formula (3), m represents an integer of 1 to 3, Y represents a single bond, $-C(R_{15})(R_{16})-$, $-C(=O)-$, $-O-$, $-SO-$ or $-SO_2-$, and both p and q are 0;
   (ii) the unit (a1) is represented by the formula (4); or
   (iii) the unit (a1) is represented by the formula (5).

\* \* \* \* \*